United States Patent
Kanesaka et al.

(10) Patent No.: US 7,852,538 B2
(45) Date of Patent: Dec. 14, 2010

(54) HOLOGRAM RECORDING APPARATUS AND HOLOGRAM RECORDING METHOD

(75) Inventors: Tomoki Kanesaka, Miyagi (JP); Nobuhiro Kihara, Kanagawa (JP)

(73) Assignee: Sony Corporation, Tokyo (JP)

(*) Notice: Subject to any disclaimer, the term of this patent is extended or adjusted under 35 U.S.C. 154(b) by 132 days.

(21) Appl. No.: 11/166,081

(22) Filed: Jun. 27, 2005

(65) Prior Publication Data
US 2006/0007512 A1 Jan. 12, 2006

(30) Foreign Application Priority Data
Jul. 7, 2004 (JP) .............................. 2004-200387
Sep. 13, 2004 (JP) .............................. 2004-265078

(51) Int. Cl.
G03H 1/10 (2006.01)
G03H 1/12 (2006.01)

(52) U.S. Cl. .............................. 359/10; 359/11; 359/9; 359/22

(58) Field of Classification Search .................. 359/10, 359/11, 12, 22, 35
See application file for complete search history.

(56) References Cited

U.S. PATENT DOCUMENTS

| | | | |
|---|---|---|---|
| 4,498,740 A | * | 2/1985 | Caulfield .......................... 359/9 |
| 4,927,220 A | * | 5/1990 | Hesselink et al. ................ 359/7 |
| 5,098,176 A | * | 3/1992 | Wolf .............................. 359/11 |

FOREIGN PATENT DOCUMENTS

| | | |
|---|---|---|
| JP | 09-305094 | 11/1997 |
| JP | 2002-123161 | 4/2002 |
| JP | 2002-297008 | 10/2002 |
| JP | 2003-337524 | 11/2003 |
| JP | 2005-148242 | 6/2005 |
| JP | 2006-017898 | 1/2006 |
| JP | 2006-023445 | 1/2006 |
| JP | 2006-030380 | 2/2006 |
| JP | 2006-527395 | 11/2006 |

OTHER PUBLICATIONS

Japanese Office Action Application No. 2004-265078 issued May 7, 2010; 2 pgs.

* cited by examiner

*Primary Examiner*—Audrey Y Chang
(74) *Attorney, Agent, or Firm*—Oblon, Spivak, McClelland, Maier & Neustadt, L.L.P.

(57) ABSTRACT

At the time of varying the angle of a scan mirror for varying the angle of incidence of a reference beam on a hologram recording material, the angle of a slit is also varied in conjunction, whereby the beam diameter of the reference beam is varied by the slit so that the irradiation range on the hologram recording material will be constant without being varied according to the variation in the incidence angle of the reference beam. This ensures that the area of irradiation of the hologram recording material with the reference beam can always be kept constant, even when the incidence angle of the reference beam is varied at the time of recording holograms by the angle multiplex recording system.

24 Claims, 22 Drawing Sheets

MEDIUM INCIDENCE ANGLE B

MEDIUM INCIDENCE ANGLE B

MEDIUM INCIDENCE ANGLE C

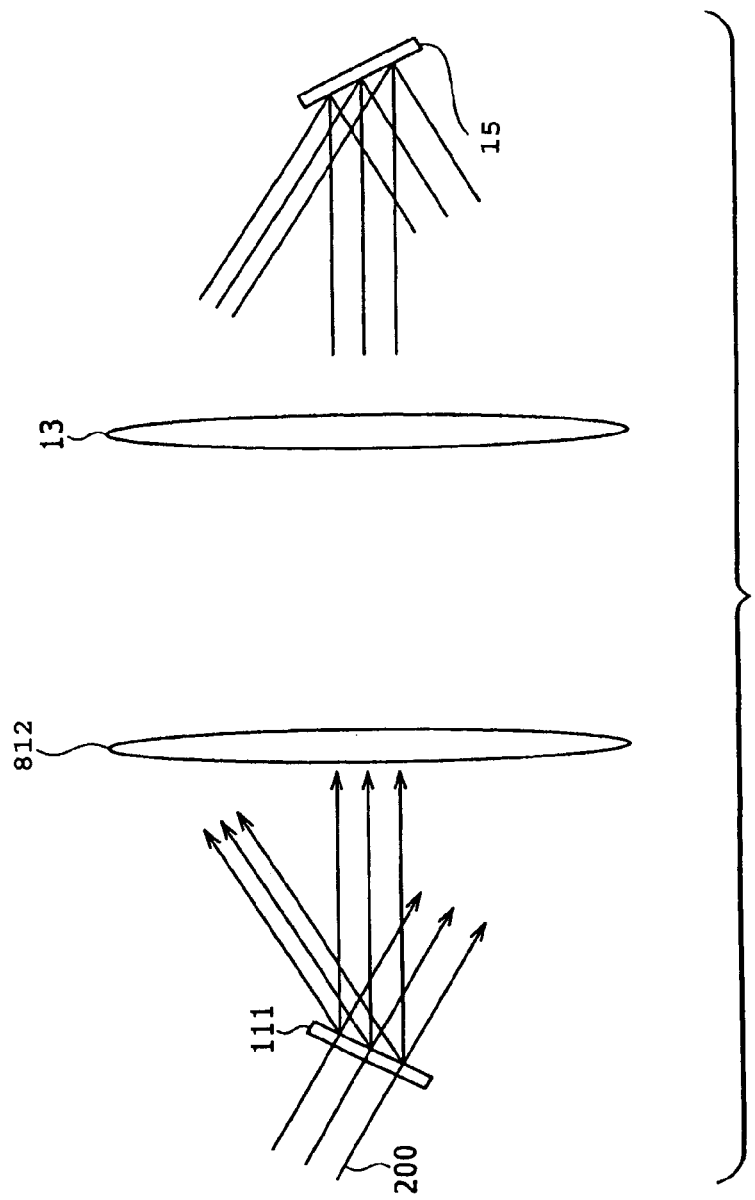

MEDIUM INCIDENCE ANGLE A

MEDIUM INCIDENCE ANGLE B

MEDIUM INCIDENCE ANGLE C

HOLOGRAM RECORDING APPARATUS AND HOLOGRAM RECORDING METHOD

BACKGROUND OF THE INVENTION

The present invention relates to a hologram recording apparatus and method for multiplexed recording of a hologram on a hologram recording medium by an angle multiplex system.

In recent years, hologram recording/reproduction apparatuses for recording and reproducing a large capacity of data by utilizing the hologram technology have been proposed (see, for example, IBM J. RES DEVELOP VOL. 44 NO. 3 May 2000 "Holographic data storage"). In the hologram recording/reproduction apparatus, a technique called multiplex recording is used for enhancing the recording density. Unlike the conventional recording, this technique consists in recording a multiplicity of independent pages at a location. Representative examples of the multiplex recording system include angle multiplex recording, shift multiplex recording and phase code multiplex recording, and other various systems such as speckle multiplexing are also known.

FIG. 20 illustrates the case of recording on a hologram recording material (hologram recording medium) by the angle multiplex system. Laser light emitted from a laser light source (not shown) is branched into a signal beam and a reference beam, and the signal beam 100 having undergone spatial beam modulation in a beam spatial modulator (not shown) passes through a signal beam optical system (not shown) to be condensed on the hologram recording material 10. On the other hand, the reference beam 200 passes through a reference beam optical system (not shown) to be incident on a scan mirror 1, and is reflected by the scan mirror 1 to be incident on a lens 2 in the reference beam optical system. The lens 2 and a lens 3 constitute a 4f optical system, the reference beam 200 irradiates the hologram recording material 10 therewith through the lens 3, and an interference fringe generated by interference between the signal beam 100 and the reference beam 200 is recorded on the hologram recording material 10. Here, when the angle of the scan mirror 1 is varied, the angle of incidence of the reference beam 200 on the hologram recording material 10 is varied according to the angle variation, and holograms different on the basis of each incidence angle are multiplex recorded in the same recording region on the hologram recording material 10.

FIG. 21 illustrates the case where the area of irradiation of the hologram recording material 10 with the reference beam 200 is varied according to variation in the incidence angle of the reference beam 200. Since the diameter of the beam is constant irrespectively of a difference in the angle of incidence (with reference to the normal to the medium) of the reference beam 200 on the hologram recording material 10, the irradiation area in the case of incidence angle A is smaller than that in the case of incidence angle B, as is clear from the figure.

FIG. 22 illustrates the manner of a variation of the irradiation area in response to a variation in the incidence angle of the reference beam 200. Where the beam diameter of the reference beam 200 is $\phi 1$, as the angle of the scan mirror 1 becomes greater and the incidence angle of the reference beam 200 becomes greater as shown in FIGS. 10A, 10B and 10C, the diameter of the portion of irradiation of the hologram recording material 10 with the reference beam 200 becomes greater in the order of $\phi 1$, $\phi 2$ and $\phi 3$.

In the angle multiplex recording system, when the angle of incidence of the reference beam 200 on the hologram recording material 10 is varied, the signal beam 100 irradiates the same area portion of the hologram recording material 10 at a fixed incidence angle, irrespectively of the variation in the incidence angle of the reference beam 200. This means that, as the area of irradiation with the reference beam 200 is increased, the range of irradiation of the hologram recording material 10 with the reference beam 200 inclusive of the range of irradiation with the signal beam 100 is broadened. Intrinsically, however, it is desirable for the reference beam 200 to irradiate in such a range as to cover to a required minimum extent the range of irradiation of the hologram recording material 10 with the signal beam 100. This is because the irradiation of an unnecessary portion with the reference beam 200 would sensitize the hologram recording material 10 in excess accordingly, attended by wasting of the dynamic range thereof and leading to a lowering in the recording capacity.

SUMMARY OF THE INVENTION

Thus, there has been a need for provision of a hologram recording apparatus and a hologram recording method by which the area of irradiation of a hologram recording material with a reference beam can always be kept constant even when the incidence angle of the reference beam is varied, in recording a hologram by an angle multiplex recording system.

In response to the above-mentioned need, according to an embodiment of the present invention, there is provided a hologram recording apparatus for recording, on a hologram recording medium by an angle multiplex system, an interference fringe generated by interference between a signal beam and a reference beam varied in the angle of incidence on the hologram recording medium, wherein an irradiation range fixing section for making substantially constant the range of irradiation of the hologram recording medium with the reference beam is provided in a reference beam optical system.

In the present invention, the irradiation range fixing section may be a beam diameter regulating section for regulating the beam diameter of the reference beam, and the beam diameter regulating section may be provided in the reference beam optical system.

Besides, in the present invention, the irradiation range fixing section may include a slit which is fixedly disposed, and a lens group of a telecentric imaging optical system for irradiating the slit with the reference beam with its optical path changed by a scan mirror for varying the incidence angle.

Thus, according to an embodiment of the present invention, in the case of, for example, multiplex recording of data patterns by varying the angle of incidence of the reference beam on the hologram recording medium by the angle multiplex system, the beam diameter of the reference beam can be regulated according to the variation in the incidence angle of the reference beam, and the beam diameter of the reference beam is so regulated as to cancel the increase of the diameter in the major axis direction of the reference beam on the hologram recording medium attendant on the increase of the incidence angle of the reference angle, whereby the area of irradiation of the hologram recording medium with the reference beam is made substantially constant irrespectively of the variation in the incidence angle of the reference beam. This makes it possible to prevent the hologram recording medium from being sensitized in excess, to maintain the dynamic range thereof, and to secure the recording capacity as specified.

In addition, the slit which is fixedly disposed and the lens group of the telecentric imaging optical system for irradiating the slit with the reference beam with its optical path changed by the scan mirror for varying the incidence angle may be provided, and the positional relationship between the hologram recording medium and the slit may be so set that the hologram recording medium and the slit satisfy the Shcheimpflug rule, by the lens group of the telecentric imaging optical system for irradiating the hologram recording medium disposed to be inclined against the optical axis with the reference beam having passed through the slit. This configuration ensures that the area of irradiation of the hologram recording medium with the reference beam can be made substantially constant irrespectively of the variation in the incidence angle of the reference beam, and the same effects as above can be obtained.

Besides, a diffraction grating, for example, may be used as a diffracting optical device, and the diffracting grating and the hologram recording medium may be disposed in an imaging relationship, with a telecentric optical system (for example, 4f optical system) therebetween. This configuration ensures that, since the diffracting optical device and the hologram recording medium are in the imaging relationship even when the deflection angle of the reference beam is varied by the diffraction grating to thereby vary the angle of incidence on the hologram recording medium, the area of irradiation of the hologram recording medium with the reference beam can be prevented from being varied. Moreover, this effect can be realized by use of only one set of telecentric optical system, and can be realized without any mechanical abrasion or the like, so that it is possible to cope with a high scanning speed and to reduce the size and weight of the reference optical system.

According to the present invention, in performing multiplex recording of data patterns by varying the angle of incidence of a reference beam on a hologram recording medium by the angle multiplex system, the area of irradiation of the hologram recording medium with the reference beam can always be kept constant irrespectively of variations in the incidence angle of the reference beam at the time of recording holograms based on the angle multiplex recording system, by regulating the beam diameter of the reference beam according to the variation of the incidence angle of the reference beam so as to cancel the increase of the diameter in the major axis direction of the reference beam on the hologram recording medium attendant on the increase in the incidence angle of the reference beam, or by setting the positional relationship between the hologram recording medium and the slit so that the hologram recording medium and the slit satisfy the Shcheimpflug rule, by use of the lens group of the telecentric imaging optical system for irradiating the hologram recording medium disposed to be inclined against the optical axis with the reference beam having passed through the slit, or by disposing the diffraction grating and the hologram recording medium in an imaging relationship, with the telecentric optical system (for example, 4f optical system) therebetween. Therefore, since the reference beam irradiation region on the hologram plane is not varied even when the incidence angle of the reference beam is varied, the reference beam can always cover a required minimum region inclusive of the signal beam region; as a result, it is possible to obviate exposure of a wasteful region, to obviate wasting of the dynamic range of the hologram recording medium, and to maintain the recording capacity as specified.

BRIEF DESCRIPTION OF THE DRAWINGS

FIG. 11 is a block diagram showing the operation of the reference beam optical system shown in FIG. 8.

DETAILED DESCRIPTION OF THE PREFERRED EMBODIMENTS

Example 1

Figure 1A:
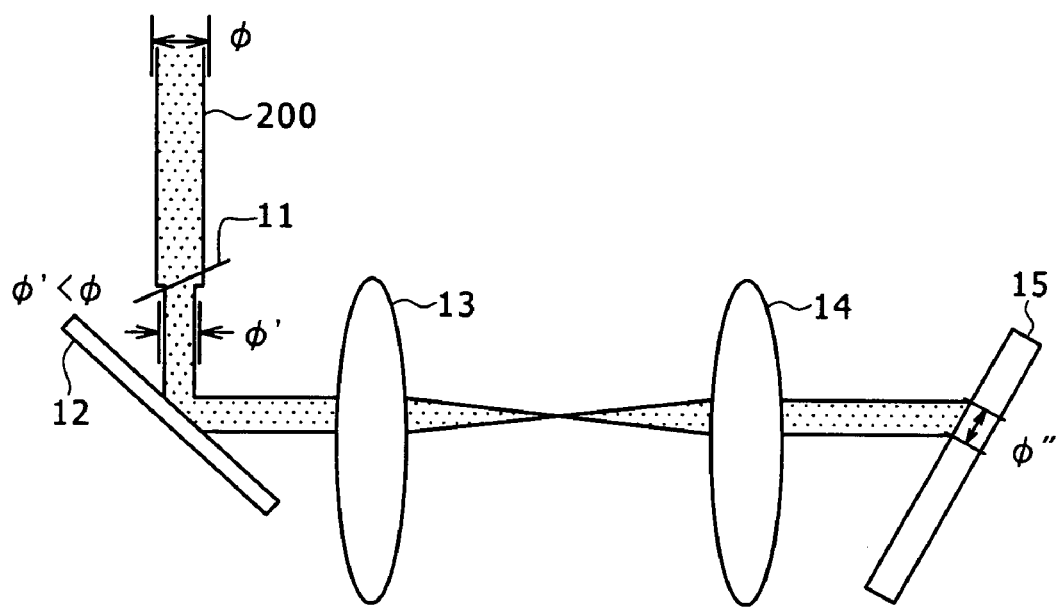
FIGS. 1A and 1B are block diagrams showing a reference beam optical system of a hologram recording apparatus according to a first embodiment of the present invention.
Figure 1B:
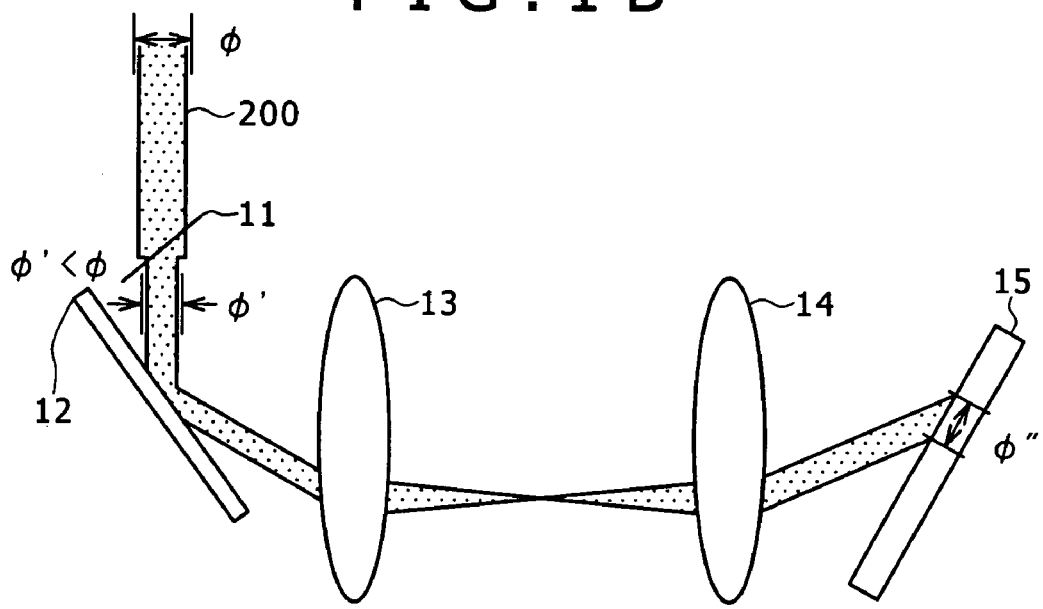

FIGS. 1A and 1B are block diagrams showing a reference beam optical system of a hologram recording apparatus according to a first embodiment of the present invention. The reference beam optical system of the hologram recording apparatus has a slit 11, a scan mirror 12, and lenses 13 and 14 of a 4f optical system, and a hologram recording material 15 is irradiated with a reference beam 200.

Next, the operation of this embodiment will be described. In FIG. 1A, the reference beam 200 passes through the slit 11, whereby its initial beam diameter $\phi 1$ is regulated to a beam diameter $\phi'$, then the reference beam 200 is reflected by the scan mirror 12 to be incident on the lens 13 of the 4f optical system, and is treated by the lens 14 of the 4f optical system, to irradiate the hologram recording material 15 therewith. In this instance, for the reason which will be described below, the diameter of the range of irradiation of the hologram recording material 15 is $\phi$.

Figure 2:
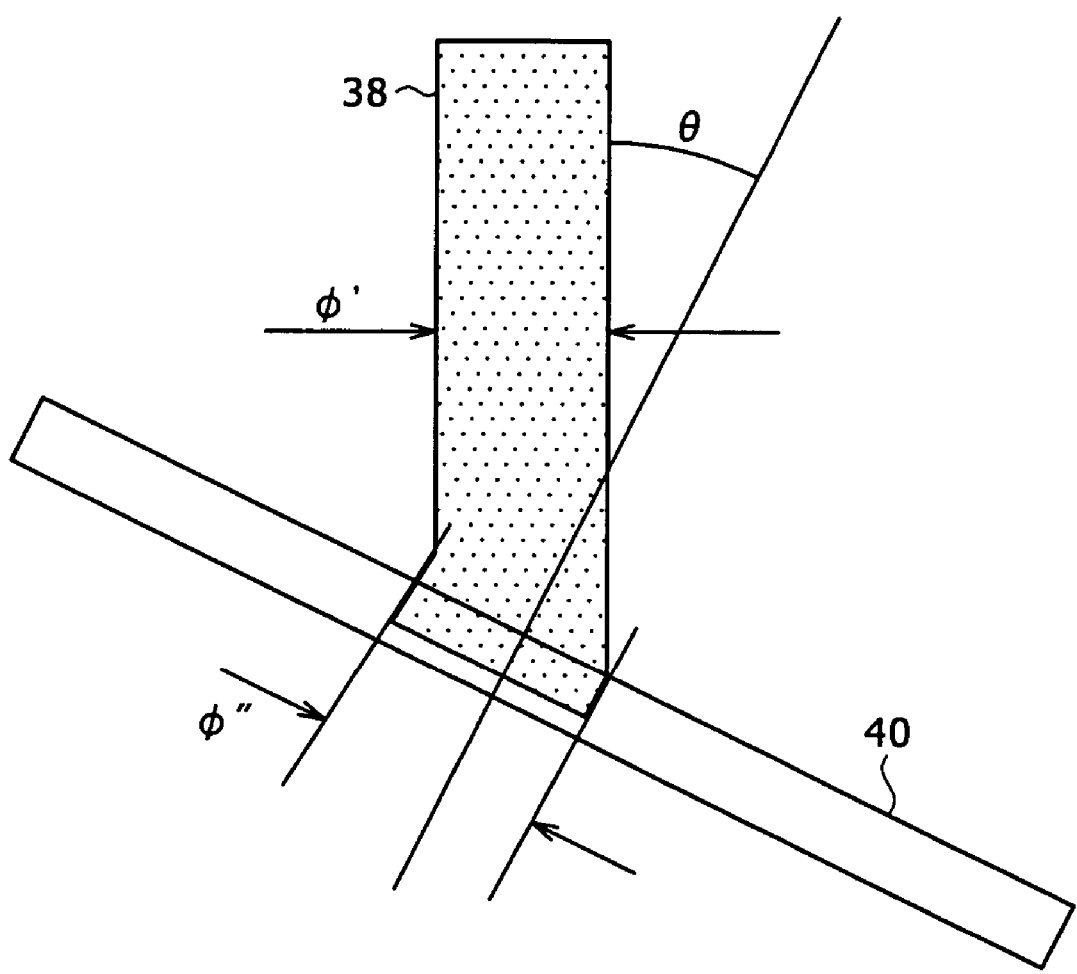
FIG. 2 illustrates a variation in the irradiation range in the case where a beam is incident on a plain surface at a certain angle.

Generally, where a parallel beam 38 having a diameter of $\phi'$ is incident on a plain surface at an angle $\theta$ against the normal to the plain surface as shown in FIG. 2, the length of the minor axis (the direction perpendicular to the paper surface in FIG. 2) is not changed, but the length $\phi''$ of the major axis is represented by $$\phi'' = \phi'/\cos\theta \quad (1)$$

Therefore, as the incidence angle of the reference beam 200 varies, a variation in the reference beam area on the hologram recording material occurs. The slit 11 in this embodiment is inserted for solving this problem.

Basically, by setting the incident reference beam to $$\phi' = \phi \cos\theta \quad (2),$$

according to the angle of incidence of the reference beam on a medium, the variation in the reference beam area due to the difference in incidence angle can be canceled. When this $\phi'$ is put into formula (1), it is seen that the beam diameter on the medium is $\phi$, which is equal to the initial beam diameter.

Figure 3:
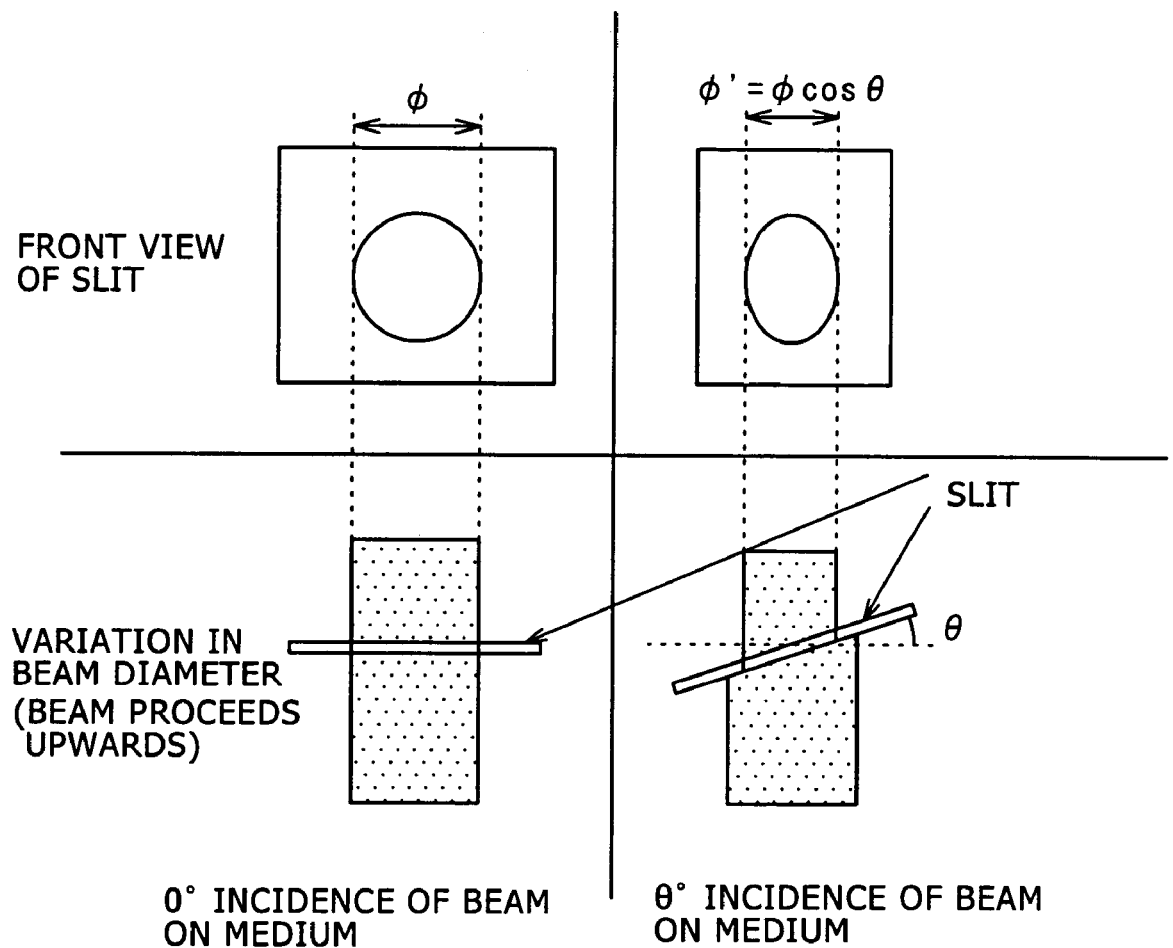
FIGS. 3A and 3B illustrate the action of a slit for contracting the beam diameter of a beam.

Here, generally, where a slit with a diameter $\phi$ as shown in FIG. 3A is disposed to be inclined at an angle $\theta$ as shown in FIG. 3B, the radius projected in the direction of the angle inclined is the orthogonal projection $\phi \cos\theta$. This is equal to formula (2) above, so that when the slit 11 disposed in front of the scan mirror 12 is set inclined by an angle equal to the incidence angle $\theta$ of the reference beam 200, the beam diameter of the reference beam 200 can be contracted by the slit 11 to $\phi \cos\theta$, and when the reference beam 200 is made to be incident on the hologram recording material 15, the length of the major axis of the irradiation range on the recording material 15 can always be $\phi$.

FIG. 1B shows the case where the angle of the scan mirror 12 shown in FIG. 1A is changed to thereby change the angle of incidence of the reference beam 200 on the hologram recording material 15. In this case, by changing also the angle of the slit 11 by the same amount to thereby contract the beam diameter of the reference beam 200, the length of the major axis of the irradiation range on the hologram recording material 15 is always $\phi$.

According to this embodiment, by contracting the beam diameter of the reference beam 200 by the slit 11 according to the angle of incidence of the reference beam 200 on the hologram recording material 15, the length of the major axis of the range of irradiation of the hologram recording material 15 with the reference beam 200 can always be kept constant, and the irradiation area can be kept constantly at a required minimum value, irrespective of the incidence angle of the reference beam 200. Therefore, wasting of the dynamic range of the hologram recording material 15 can be obviated, and a recording capacity as specified can be maintained.

Figure 4:
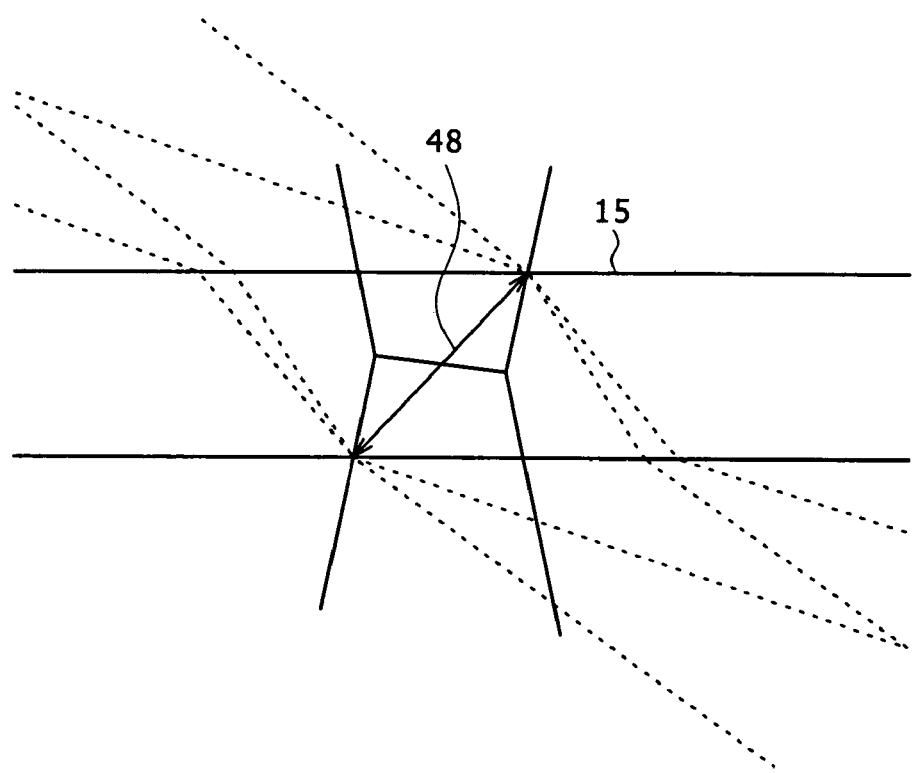
FIG. 4 illustrates the manner of taking a normal in the case where the slit shown in FIG. 1 has a thickness.

While description has been made in this embodiment assuming, for simplification, that the thickness of the hologram recording material 15 is negligible, the hologram recording material 15 used in practice is a thick medium in many cases. In those cases, for ensuring that the portion indicated by 48 in FIG. 4 is always overlapped, the portion is deemed as a medium surface, and the angle is calculated while taking the normal thereto as the normal to medium in the above-mentioned calculation, whereby the same result as above can be obtained, and the area of irradiation of the hologram recording material 15 with the reference beam 200 can be kept constantly at the required minimum value irrespective of the incidence angle of the reference beam 200.

Example 2

Figure 5:
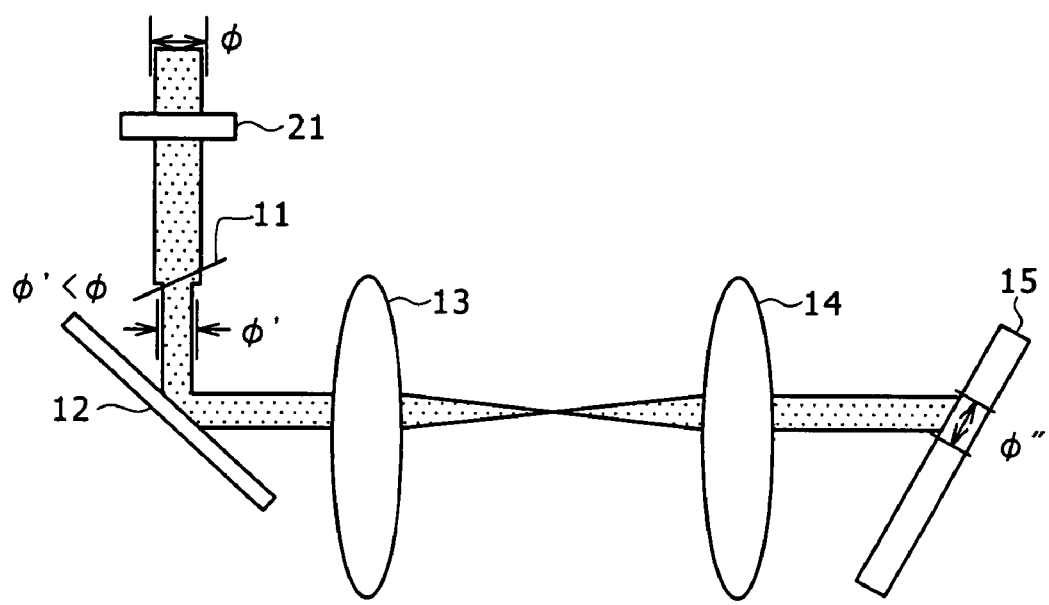
FIG. 5 is a block diagram showing a reference beam optical system of a hologram recording apparatus according to a second embodiment of the present invention.

FIG. 5 is a block diagram showing a reference beam optical system of a hologram recording apparatus according to a second embodiment of the present invention. Here, the same parts as those in the first embodiment shown in FIGS. 1A and 1B are denoted by the same symbols as used above, in the following description. The hologram recording apparatus in this embodiment has a configuration in which the intensity of a reference beam 200 on a hologram recording material 15 is kept constant by use of a variable type ND filter 21, the other configurations being the same as those in the first embodiment.

The variable type ND filter 21 is inserted on the upstream side of a slit 11 on the optical path of the reference beam 200. The reference beam 200 is attenuated in intensity by the ND filter 21, before being incident on the slit 11. The degree of attenuation by the ND filter 21 is varied according to the angle of incidence of the reference beam 200 on the hologram recording material 15. Specifically, as the angle of incidence of the reference beam 200 on the hologram recording material 15 increases, the degree of attenuation by the ND filter 21 is decreased, so as to keep constant the intensity of the reference beam 200 on the hologram recording material 15 and thereby to keep constant the ratio of the intensity of the reference beam 200 to the intensity of a signal beam, whereby multiplex recording/reproduction in angle multiplex system can be performed stably and with constant quality.

Example 3

Figure 6:
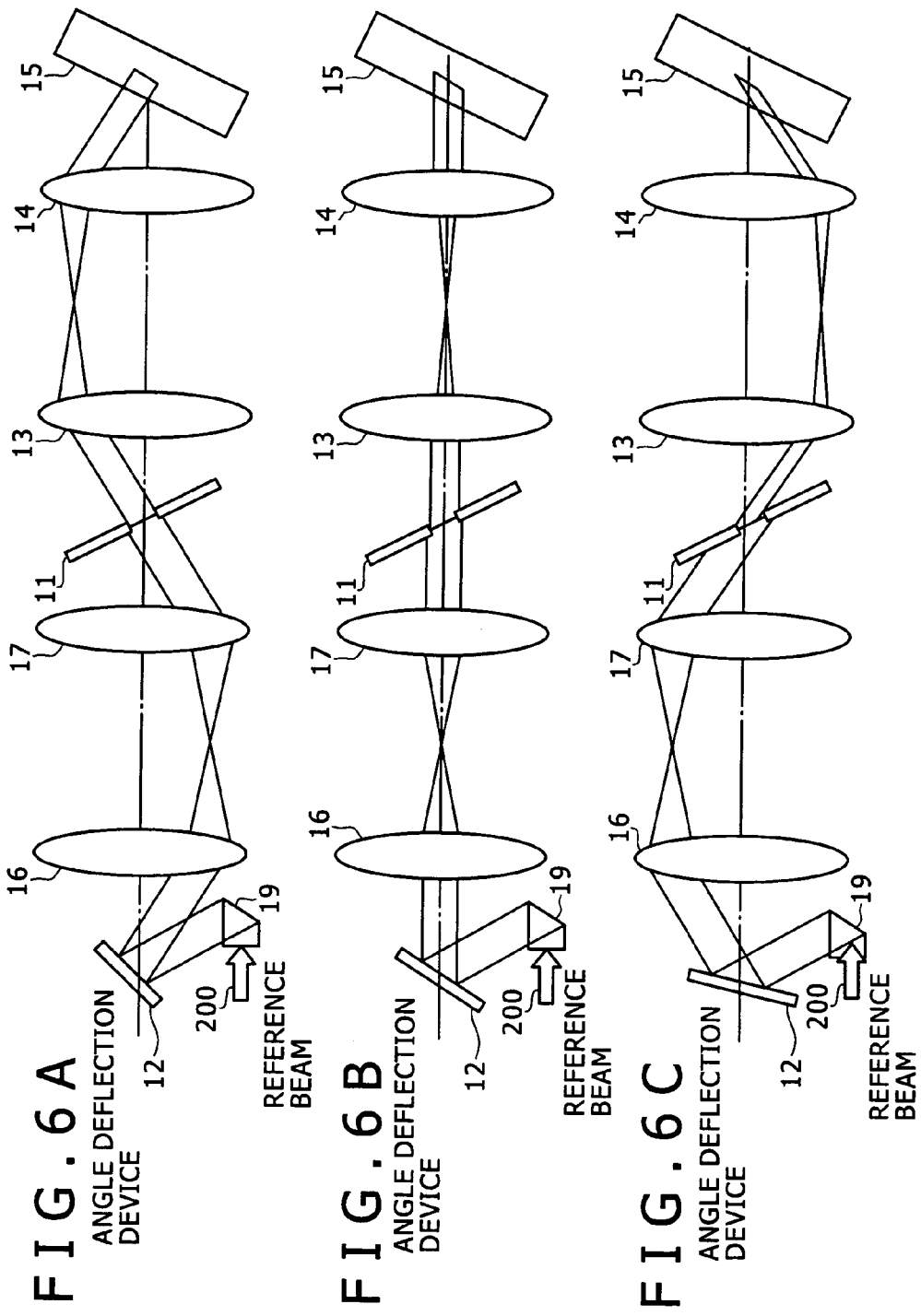
FIGS. 6A, 6B and 6C are block diagrams showing a reference beam optical system of a hologram recording apparatus according to a third embodiment of the present invention.

FIGS. 6A, 6B and 6C are block diagrams showing a reference beam optical system of a hologram recording material according to a third embodiment of the present invention. Here, the same parts as those in the first embodiment shown in FIGS. 1A and 1B will be denoted by the same symbols used above, in the following description. The reference beam optical system of the hologram recording apparatus has a mirror 19, a scan mirror 12, lenses 16 and 17 of a 4f optical system, a slit 11, and lenses 13 and 14 of a 4f optical system, and a reference beam 200 is incident on a hologram recording material 15. It should be noted here that the slit 11 and the hologram recording material 15 are disposed in such a positional relationship as to satisfy the "Shcheimpflug rule".

Next, the operation of this embodiment will be described. In FIG. 6A, the reference beam 200, after the change of its optical path by the mirror 19, is incident on and reflected by the scan mirror 12, and passes through the lenses 16 and 17 of the 4f optical system, to be incident on a slit opened part of the slit 11 at an incidence angle of 0°. Where the slit diameter of the slit 11 is φ, the beam diameter of the reference beam 200 having passed through the slit 11 is φ, the reference beam 200 with this beam diameter is incident on the lens 13 of the 4f optical system, and is treated by the lens 14 of the 4f optical system to irradiate the hologram recording material 15 therewith at an incidence angle of 0°.

In this case, the angle of the scan mirror 12 is changed in three ways as shown in FIGS. 6A to 6C and as will be described below. In the example of FIG. 6A, the lenses 16 and 17 constitute a so-called 4f optical system, while the lenses 13 and 14 constitute another 4f optical system, the scan mirror 12 and the slit 11 are in an imaging relationship, while the slit 11 and the hologram recording material 15 are also in an imaging relationship.

In addition, while the hologram recording material 15 is disposed to be inclined against the optical axis, it is assumed that the hologram recording material 15 and the slit 11 are set in such a positional relationship as to satisfy the Shcheimpflug rule by the lenses 13 and 14, so that the slit plane is imaged on the hologram recording material 15. Besides, it is assumed that the reference beam 200 irradiating the slit plane therewith would have its irradiation area on the slit varied according to the angle of the scan mirror 12 but that the reference beam 200 has such a beam diameter as to cover the slit plane irrespectively of the angle. Where the slit 11 and the range of irradiation of the hologram recording material 15 with the reference beam 200 are in the imaging relationship, the diameter φ of the slit 11 is necessarily the diameter of the irradiation range, so that the diameter of the irradiation range is also at the constant value of φ irrespectively of the angle of the scan mirror 12; in addition, it is seen that the reference beam 200 having passed through the slit 11 irradiates the same region on the hologram recording material 15 therewith irrespectively of the angle of the scan mirror 12.

FIGS. 6B and 6C show the cases where the angle of the scan mirror 12 is changed, and, on the above-mentioned ground, the major diameter of the range of irradiation of the hologram recording material 15 with the reference beam 200 is at a constant value of φ.

According to this embodiment, the lenses 16 and 17 of the 4f optical system are inserted between the scan mirror 12 and the slit 11, and the reference beam 200 reflected by the scan mirror 12 is passed through the lenses 16 and 17 of the 4f optical system to irradiate the slit part of the slit 11 therewith, whereby, even with the slit 11 fixed against the rotation of the scan mirror 12, contraction of the beam diameter of the reference beam 200 according to the variation in the angle of incidence of the reference beam 200 on the hologram recording material 15 can be achieved with the fixed slit 11, and the same effect as in the first embodiment is obtained. Particularly, since the slit 11 may be kept fixed against the rotation of the scan mirror 12, mechanical instability and worsening of accuracy and the like troubles are reduced, and the reliability of the apparatus can be enhanced accordingly.

Incidentally, while the 4f optical systems are used in this embodiment, the 4f optical systems are each a kind of telecentric imaging optical system, and, generally, the same effect can be obtained when a telecentric imaging optical system is used.

Figure 7:
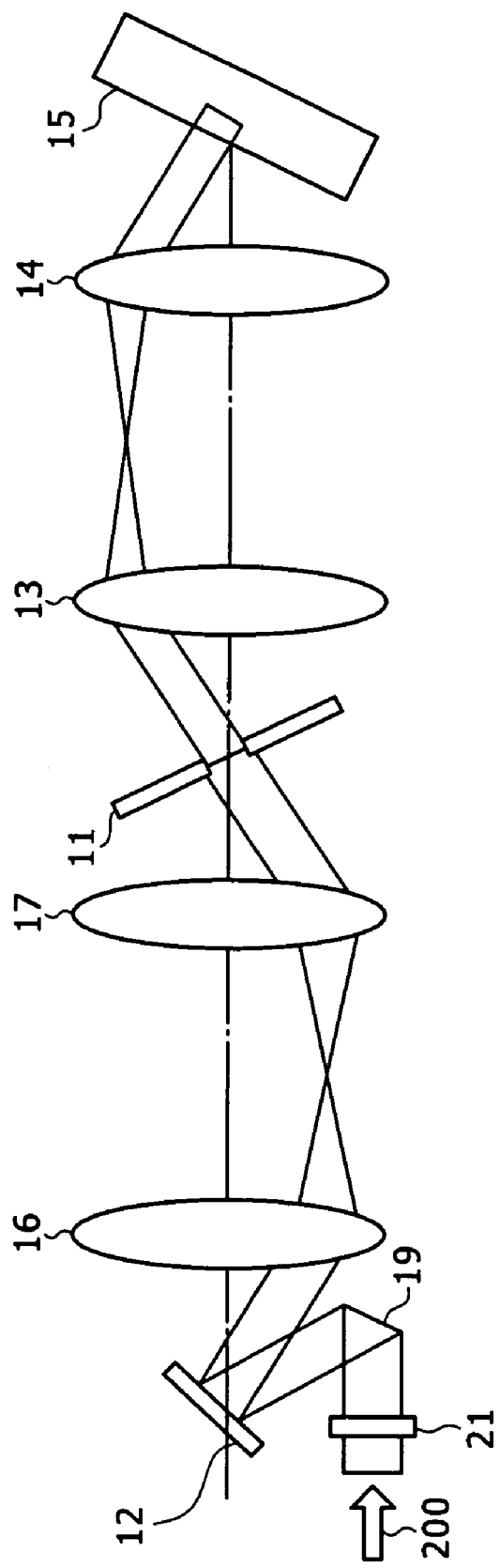
FIG. 7 is a block diagram showing another example of the reference beam optical system of the hologram recording apparatus according to the third embodiment.

In addition, a configuration may be adopted in which, as shown in FIG. 7, an ND filter 21 is inserted in a reference beam optical system on the upstream side of a scan mirror 12, and, as the angle of incidence of a reference beam 200 on a hologram recording material 15 increases, the degree of attenuation by the ND filter 21 is decreased so as to make constant the intensity of the reference beam 200 on the hologram recording material 15, whereby the intensity ratio between the reference beam 200 and a signal beam is kept constant, and multiplex recording/reproduction in angle multiplex system can be performed stably and with constant quality.

Example 4

Figure 8A:
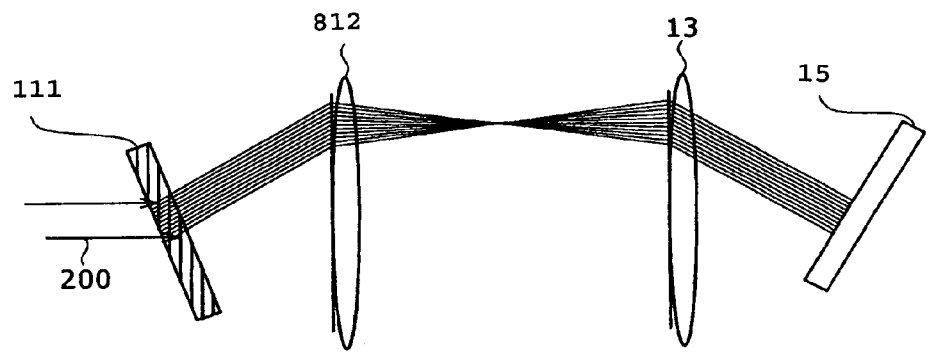
FIGS. 8A, 8B and 8C are block diagrams showing the configuration of a reference beam optical system of a hologram recording apparatus according to a fourth embodiment of the present invention.
Figure 8B:
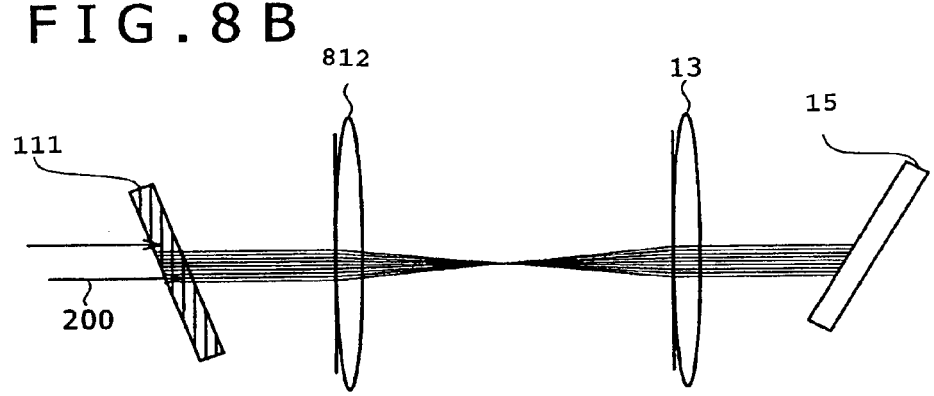
Figure 8C:
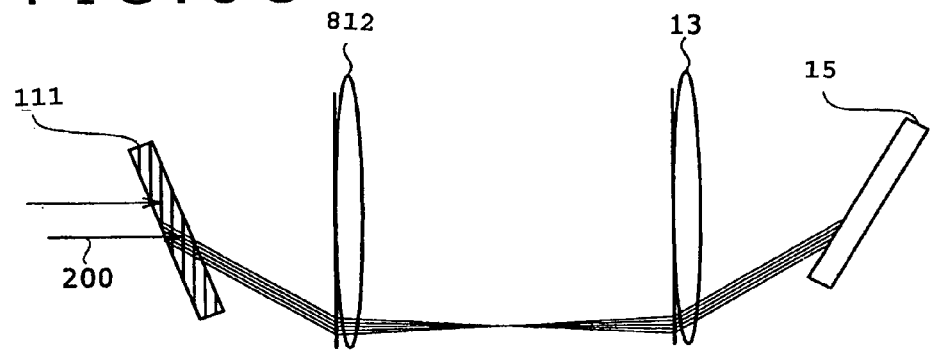

FIGS. 8A to 8C are block diagrams showing a reference beam optical system of a hologram recording apparatus according to a fourth embodiment of the present invention. The reference beam optical system of the hologram recording apparatus based on the angle multiplex system has a diffracting optical device (hologram scanner) such as a diffraction grating 111, a lens 812, a lens 13, and a hologram recording material 15. The diffracting optical device functions as an angle deflecting device to change the angle of incidence of a reference beam 200 on the hologram recording material 15. In addition, the lenses 812 and 13 constitute a 4f optical system which is a telecentric imaging optical system, and the diffraction grating 111 and the hologram recording material 15 are disposed in a mutually imaging relationship. This configuration makes it possible to enhance the scanning speed, to prevent mechanical mechanisms from being abraded, and to prolong the useful life, as compared with Example 1 having the mechanism for mechanically varying the slit size according to the angle variation of the reference beam 200. In addition, since the two 4f projecting optical systems connected in series require a large number of optical parts and much space, this method of providing the diffraction grating is advantageous in reductions in size and weight of the reference beam optical system and, hence, of the pick-up, as compared with Example 3 in which the two 4f projecting optical systems connected in series are inserted in the reference beam optical system.

Figure 9:
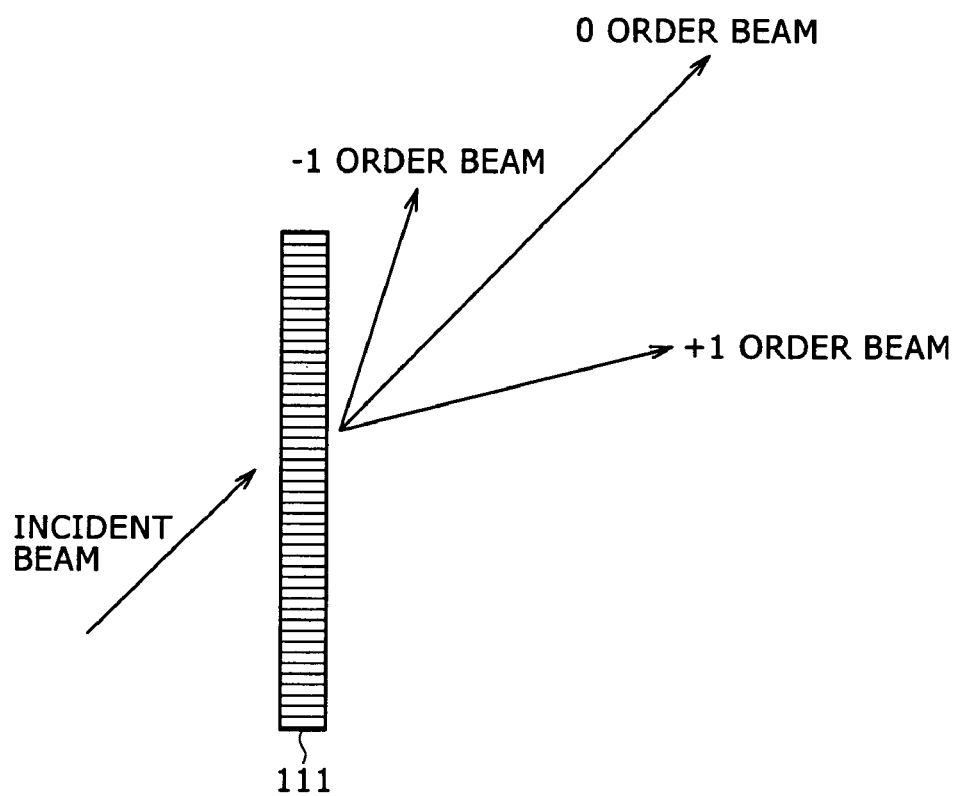
FIG. 9 illustrate the operation of a diffraction grating as the diffracting optical device shown in FIG. 8.

FIG. 9 is a diagram showing a detailed configuration example of the diffracting optical device shown in FIGS. 8A to 8C. This figure shows an example of using a diffraction grating 111, which is the simplest as the diffracting optical device 11. The incident beam is diffracted by the diffraction grating 111, and the angle thereof is deflected.

Figure 10B:
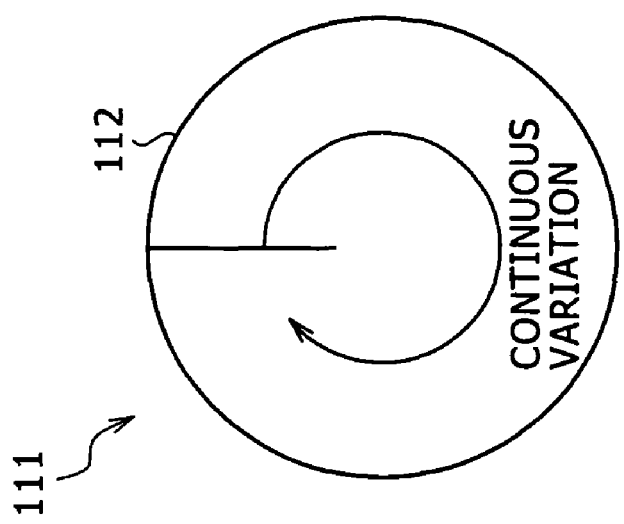
FIGS. 10A and 10B are diagrams showing a structural example of the diffraction grating shown in FIG. 8 and the relationship between scanner angle and deflection angle.
Figure 10A:
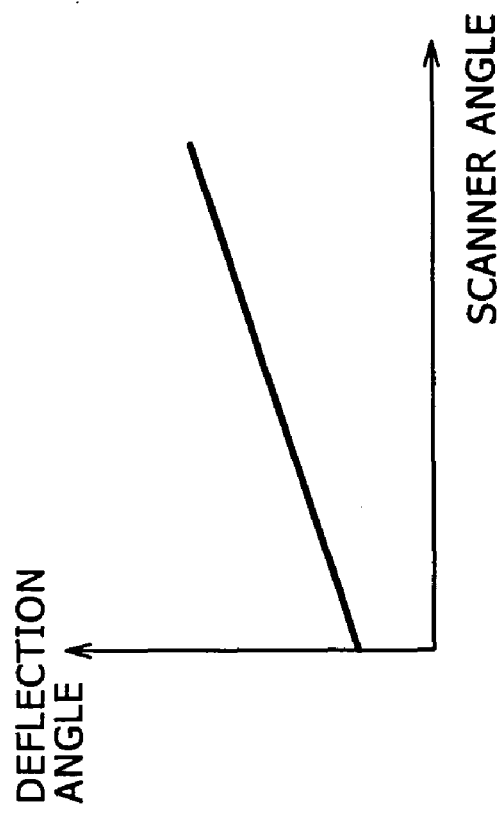

The diffraction grating ill has a configuration in which, as shown in FIG. 10A, the diffraction grating gap is continuously varied according to the rotation of a disk-like substrate 112, with the result that the deflection angle of beam is varied continuously. Specifically, when diffraction gratings different in pitch are incorporated in the disk-like substrate 112 and the assembly is rotated as indicated by arrow, scanning of the incident beam can be achieved. FIG. 10B shows the relationship between scanner angle (rotational angle of the substrate 112) and deflection angle, of the diffraction grating 111 shown in FIG. 10A, in which the deflection angle increases continuously and linearly as the scanner angle increases.

Next, the operation of this embodiment will be described. In FIG. 8A, the reference beam 200 is incident on the diffraction grating 111, the reference beam 200 is deflected according to a scanner angle a of the diffraction grating 111 at that time, is incident on the lens 812, and is further treated by the lens 13 to be incident on the hologram recording material 15 at an angle according to the scanner angle a. Similarly, as shown in FIG. 8B, the reference beam 200 is deflected according to a scanner angle b of the diffraction grating 111, is incident on the lens 812, and is treated by the lens 13 to be incident on the hologram recording material 15 at an angle according to the scanner angle b. Similarly, as shown in FIG. 8C, the reference beam 200 is deflected according to the scanner angle c of the diffraction grating 111, is incident on the lens 812, and is treated by the lens 13 to be incident on the hologram recording material 15 at an angle according to a scanner angle c.

Since the reference beam 200 outgoing from the diffraction grating 111 forms an image on the hologram recording material 15 through a telecentric imaging optical system shown in FIG. 11, the incidence area (the spot size of the reference beam) thereof on the hologram recording material 15 is the same as the range of the reference beam mentioned above. Since the reference beam range is constant independently of the scanner angle of the diffraction grating 111, the range of irradiation on the hologram recording material 15 with the reference beam 200 forming an image on the hologram recording material 15 is also constant independently of the scanner angle of the diffraction grating 111, i.e., the angle of incidence of the reference beam 200 on the hologram recording material 15.

Here, when a continuous variation type beam scan as shown in FIGS. 10A and 10B is used as the diffraction grating 111, the period of time for which the beam is at a certain angle is extremely short. As a result, the time of reproduction of one hologram page recorded by angle multiplex system is extremely short. If the reproduction time of one hologram page is short, the intensity of light received by an image sensor becomes weak, S/N ratio is worsened and reproduction may be impossible, in the case where the power of reproducing laser is weak or the diffraction efficiency of the recorded hologram data is low. These problems become further conspicuous as the beam scan speed is gradually raised for enhancing the data transfer rate.

Figure 12B:
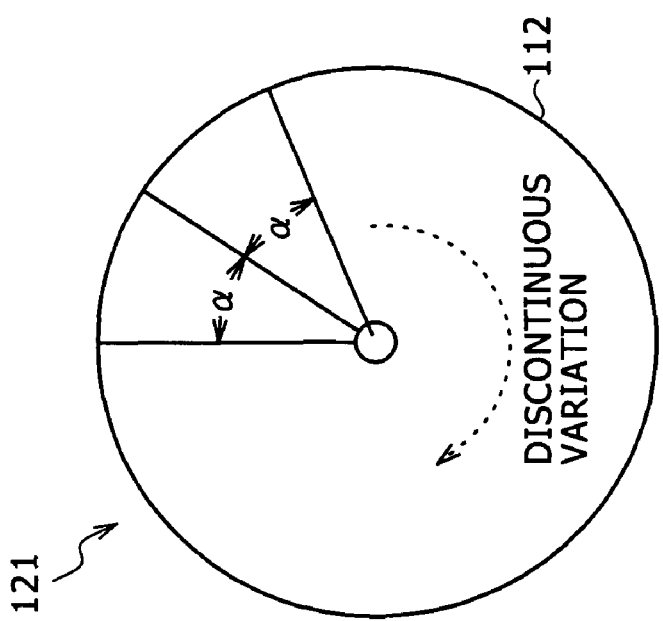
FIGS. 12A and 12B are diagrams showing another structural example of the diffraction grating shown in FIG. 8 and the relationship between scanner angle and deflection angle.
Figure 12A:
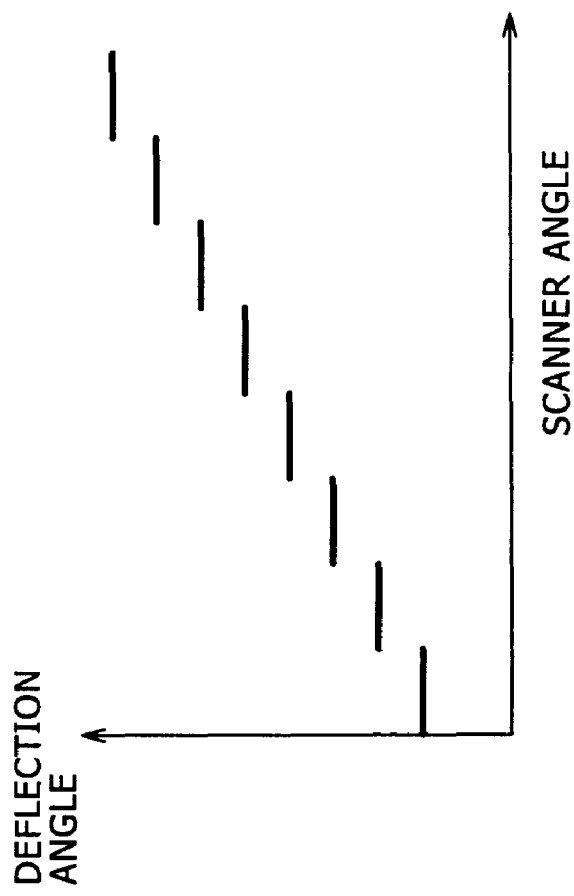

FIGS. 12A and 12B are diagrams for illustrating the configuration of a diffraction grating 121 for obviating the troubles which might be generated in the case of using the above-mentioned diffraction grating 111. The diffraction grating 121 has a configuration in which the diffraction grating gap varies discontinuously and stepwise on the basis of each split angle α, instead of varying continuously, as shown in FIG. 12A. Specifically, the diffraction grating gap is constant within the split angle α, but the diffraction grating gap varies in a predetermined proportion on the basis of each split angle. Therefore, when this diffraction grating 121 is used, as shown in FIG. 12B, the deflection angle is kept constant for the period in which the scanner angle is within a certain split angle range, but the deflection angle varies stepwise upon entrance into the next split angle, and this operation is repeated. In short, as shown in FIG. 15B, a relationship can be obtained in which the deflection angle varies discretely in response to the variation of the scanner angle. In this case, the time for which the incidence angle of the reference beam 200 is at a certain angle becomes longer, and the hologram reproduction time becomes longer, so that a reproduced image with good S/N can be obtained and, therefore, the data transfer rate can be enhanced.

According to this embodiment, by use of the diffracting optical device (in this example, the diffraction grating 121) in place of a galvano mirror which is frequently used as a beam scan device of the angle multiplex system, the discontinuous variation of the incidence angle of the reference beam as shown in FIG. 12B can be easily realized, and reproduced images with good S/N can be obtained even in the cases where the diffraction efficiency of hologram data is low, where the intensity of light received by an image sensor is weak and, further, where the data transfer rate is raised.

In addition, by disposing the diffraction grating 121 and the hologram recording material 15 are in the mutual imaging relationship by use of the 4f optical system composed of the lenses 812 and 13, the irradiation area on the hologram recording material 15 can be kept constant irrespectively of the variations in the angle of incidence of the reference beam 200 on the hologram recording material 15, whereby the exposure portion can be set to a required minimum, and the dynamic range of the hologram recording material 15 can be prevented from being lowered. Moreover, since the area of irradiation of the hologram recording material 15 with the reference beam 200 is made constant by one set of 4f optical system, the optical system can be reduced in size and weight, and, since the system does not have any mechanical abrasion part, the system is excellent in durability and the like.

Besides, the mechanism for stepwise variation of the deflection angle as shown in FIG. 12B can be realized also by use of the diffraction grating 111 configured as shown in FIG. 10. In this case, it suffices to rotate the substrate 112 of the diffraction grating stepwise instead of rotating it continuously, but this approach has difficulty in control of rotation.

Figure 13:
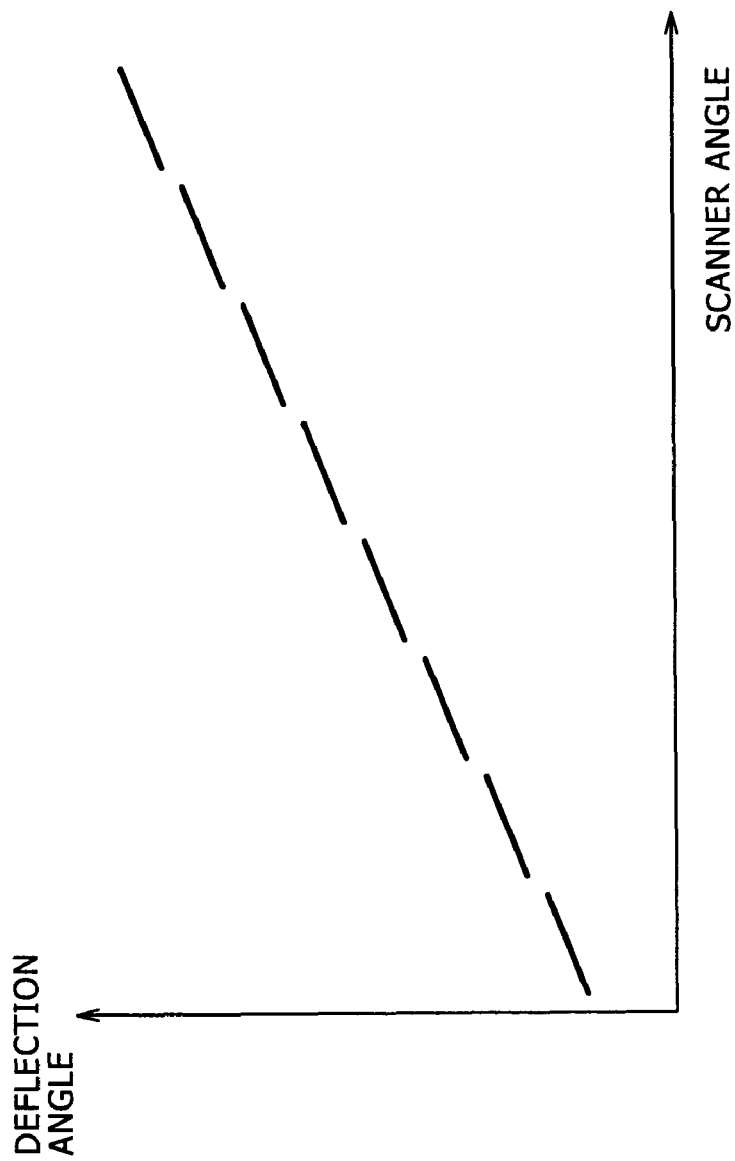
FIG. 13 is a diagram illustrating the configuration of the diffraction grating for obviating the trouble which might be generated in the case where the diffraction grating shown in FIG. 12 is used.

Incidentally, in the type in which the deflection angle varies discontinuously as shown in FIGS. 12A and 12B, the diffraction grating gap allotted to each split angle is constant; therefore, if a deviation is present in the angle of incidence of the reference beam 200 on the hologram recording material 15 corresponding to the diffraction grating gap, the reproduced image would be darker accordingly. In view of this, the diffraction grating gap allotted to the split angle may be set to vary a little, whereby a bright reproduced image can be obtained even in the presence of some deviation, due to temperature variations or the like, in the optimum incidence angle of the reference beam 200, also in the range of this split angle. FIG. 13 is a diagram showing the variation in deflection angle with variation in scanner angle in the case where this type of diffraction grating is used, in which the diffraction grating gap is varied stepwise on the basis of each split angle range and the diffraction grating gap is varied a little in the split angle range.

Meanwhile, in the angle multiplex system, it is important to make constant the light intensity ratio between the signal beam and the reference beam. In this embodiment, though the variation in light intensity with variation in the beam area of the reference beam 200 is little, the light intensity ratio is still varied due to the reference beam incidence angle dependence of the reflection at the surface of the hologram recording material or other causes, and, therefore, it is desirable that this tendency can be compensated for. For this purpose, the diffraction efficiency of the diffraction grating 111 (or 121) may be varied on the basis of each deflection angle. Here, the diffraction efficiency section the ratio between the 0 order beam and the 1 order beam shown in FIG. 9. It is possible to vary the diffraction efficiency by varying this ratio. There are some already known methods for varying the diffraction efficiency.

For example, where the diffraction grating 111 is of the phase type, there can be adopted a method in which the phase variation amount of the diffraction grating 111 is regulated. For example, the diffraction efficiency can be varied by changing the thickness of a rugged portion forming the diffraction grating, and the thickness of the rugged portion constituting the diffraction grating may be changed on the basis of each split angle range of the diffraction grating 111 so that the light intensity ratio between the signal beam and the reference beam will be constant.

Where the diffraction grating 111 is of the amplitude type, by use of coatings different in light absorbance on the basis of each split angle range of the diffraction grating 111 so as to vary the optical density, the diffraction efficiency may be varied on the basis of deflection angle, whereby the light intensity ratio between the signal beam and the reference beam can be made constant. Further, by regulating the width of the diffraction gratings forming the diffraction grating 111 so as to vary the light transmittance, also, it is possible to vary the diffraction efficiency, and, by use of this, the light intensity ration between the signal beam and the reference beam can be made constant.

In this embodiment, in the case of 100 multiplexing by the angle multiplex system, the diffraction grating gaps of the diffraction grating 111 are so cut as to obtain reference beam deflection angles for realizing the 100 multiplexing by one revolution. However, a configuration may be adopted in which the diffraction grating gaps are so cut as to realize the 100 multiplexing by one half revolution.

Example 5

Figure 14:
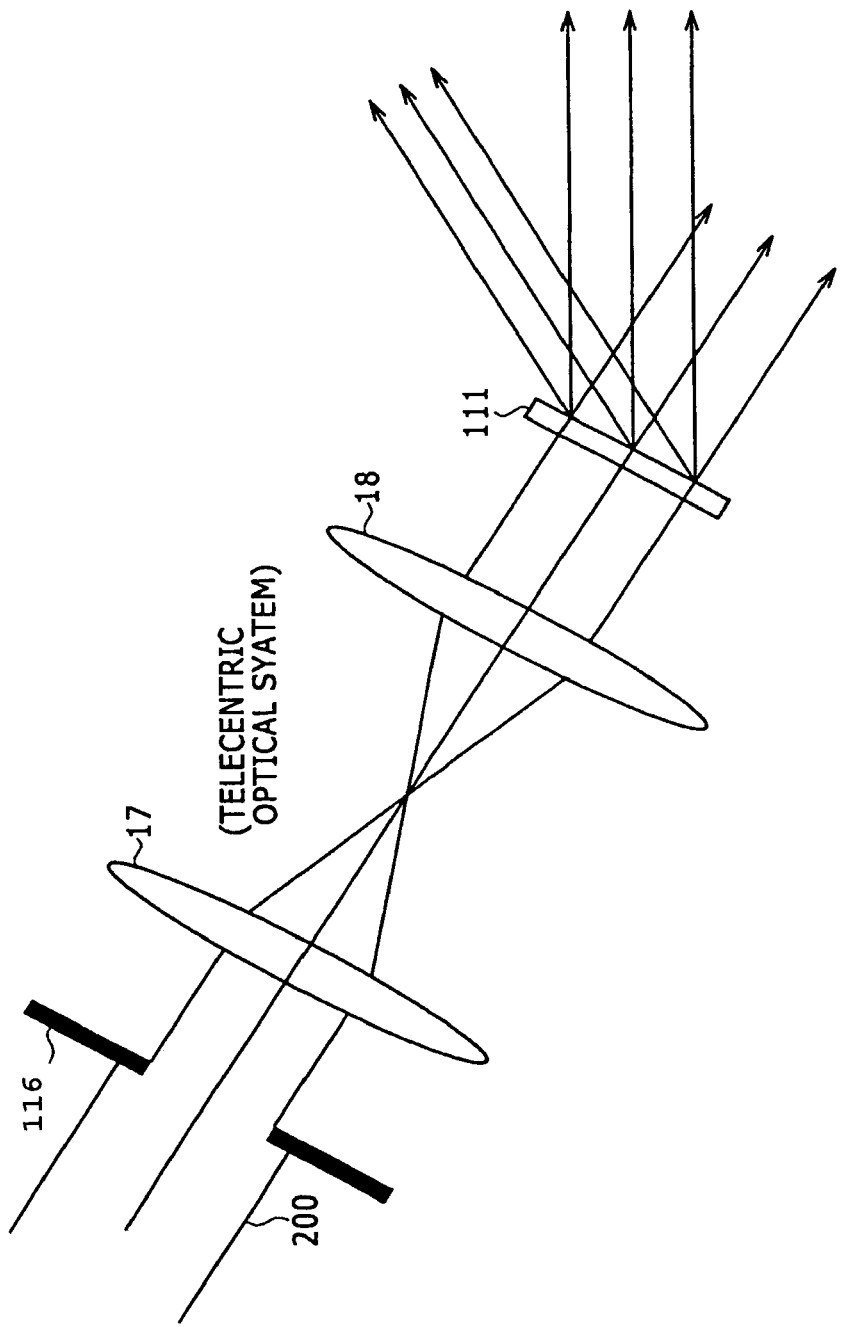
FIG. 14 is a diagram showing the configuration of a reference optical system of a hologram recording apparatus according to a fifth embodiment of the present invention.

FIG. 14 is a block diagram showing the configuration of a reference beam optical system of a hologram recording apparatus according to a fifth embodiment of the present invention. The reference beam optical system in this embodiment has a mask 116 for contracting a luminous flux, a telecentric optical system composed of lenses 17 and 18, and a diffraction grating 111, and the configuration on the downstream side of the diffraction grating 111 is the same as in FIG. 8 and, therefore, is omitted in FIG. 14.

Next, the operation of this embodiment will be described. The mask 116 and the diffraction grating 111 are disposed in a mutually imaging relationship, with the telecentric optical system therebetween. As a result, an opening part of the mask 116 is comes out on the diffraction grating 111, so that the reference beam 200 impinging on the diffraction grating 111 becomes a reference beam in a range limited by the opening part.

Figure 15:
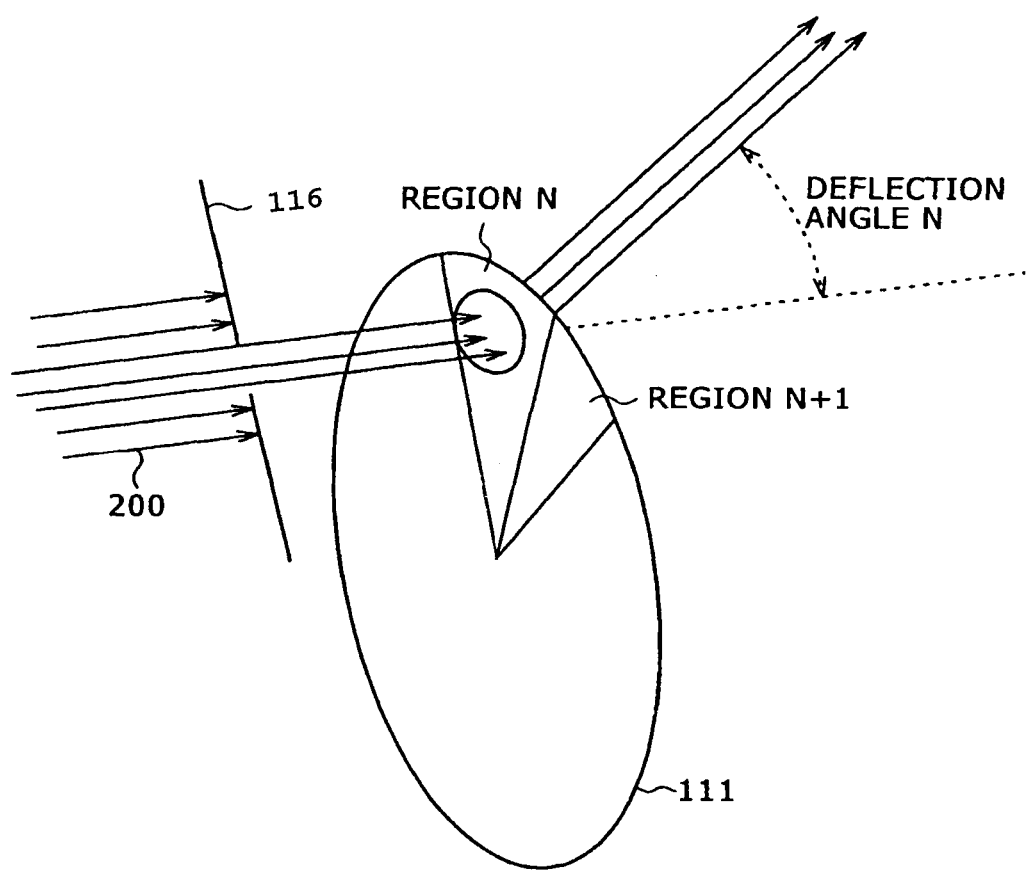
FIG. 15 is a diagram illustrating the manner in which the range of irradiation of the diffraction grating with the reference beam is limited by the mask shown in FIG. 14.
Figure 16:
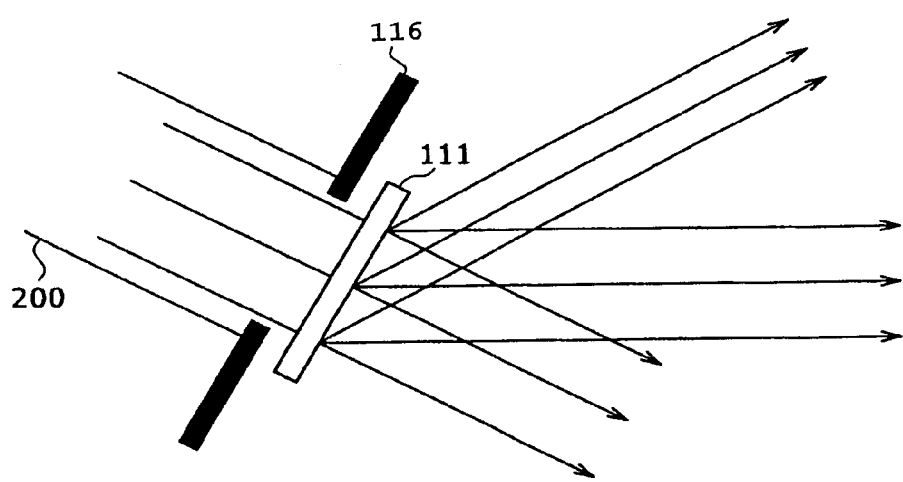
FIG. 16 is a diagram showing another example of the reference beam optical system according to the fifth embodiment shown in FIG. 14.

For example, where the diffraction grating 111 is of the type as shown in FIG. 12, (1) it is may be necessary that the range of irradiation of the diffraction grating 111 with the reference beam 200 is at least sized to be included in a split region N shown in FIG. 15 (for simplification, the telecentric optical system composed of the lenses 17 and 18 is omitted, and the configuration is according to FIG. 16). In addition, (2) it may be necessary that the range of irradiation with the reference beam 200 in relation to the size of the split region N is such that the time for scanning the boundary between the split region N and the split region N+1 is as short as possible, and the time of instability of the deflection angle of the reference beam 200 is as short as possible. Besides, (3) it may be necessary that the range of irradiation of the hologram recording material with the reference beam 200 covers the range of irradiation with the signal beam. In addition, (4) it may be necessary to use a portion of the reference beam 200 which is comparatively strong and flat in intensity as the reference beam 200, to irradiate the hologram recording material with only the required portion of the reference beam 200, to thereby prevent the hologram recording material 15 from being sensitized needlessly, and to thereby secure the dynamic range of the hologram recording material 15. Therefore, it may be necessary to regulate the beam diameter of the reference beam 200 so as to obtain a suitable beam size for satisfying these four conditions; in this embodiment, such a regulation can be achieved easily and accurately by varying the size of the opening part of the mask 116.

Incidentally, a configuration further simpler than in this embodiment may be adopted in which, as shown in FIG. 16, the telecentric optical system is omitted and the mask 116 is disposed close to the diffraction grating 111, whereby the same effect as above-mentioned can be obtained.

Example 6

Figure 17:
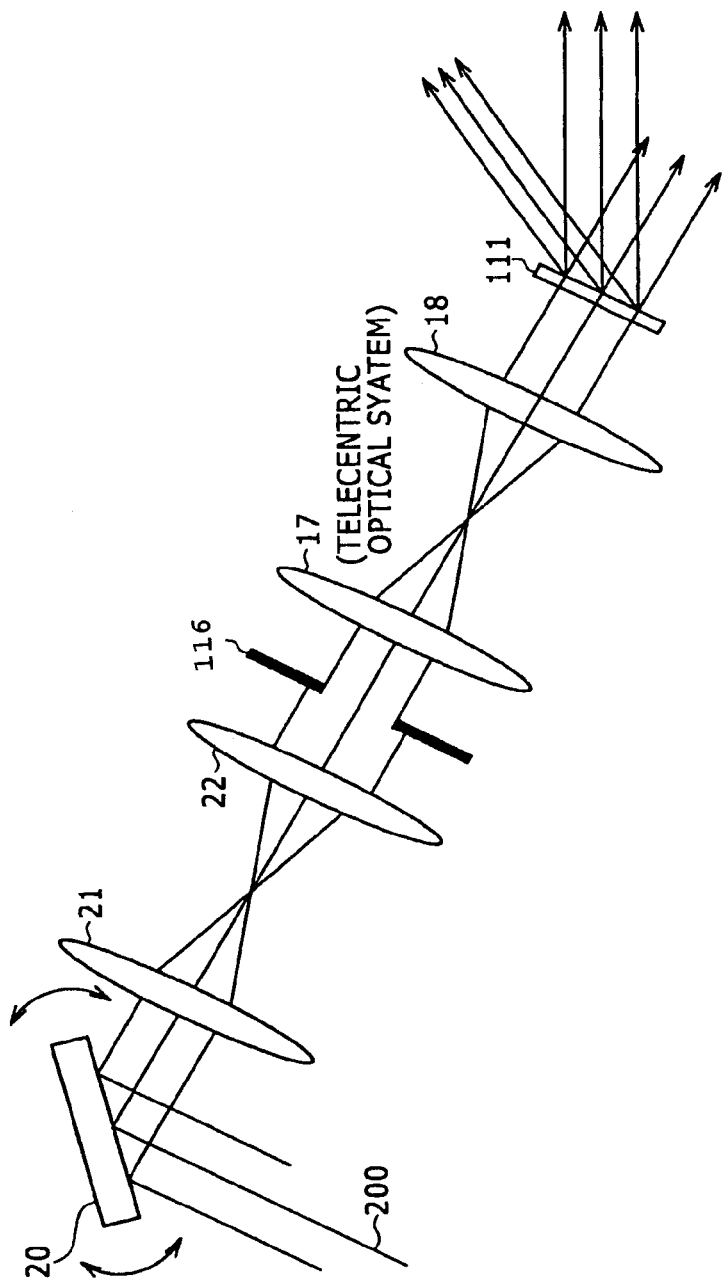
FIG. 17 is a block diagram showing the configuration of a reference optical system of a hologram recording apparatus according to a sixth embodiment of the present invention.

FIG. 17 is a block diagram showing the configuration of a reference beam optical system of a hologram recording apparatus according to a sixth embodiment of the present invention. The reference beam optical system of the hologram recording apparatus of the angle multiple system has an angle fine adjustment mirror 20, a telecentric optical system composed of lenses 21 and 22, a mask 116, a telecentric optical system composed of lenses 17 and 18, and a diffraction grating 121, and the configuration on the downstream side of the diffraction grating 121 is the same as that in FIG. 8.

Next, the operation of this embodiment will be described below. The angle fine adjustment mirror 20 and the mask 116 are so disposed as to be in a mutually imaging relationship, with the telecentric optical system composed of the lenses 21 and 22 therebetween. The path of the reference beam 200 is changed by the angle fine adjustment mirror 20, and the reference beam 200 is inputted to the lens 22. When the angle of the angle fine adjustment mirror 20 is varied, the path of the reference beam 200 is changed by an amount according to the angle variation, and the reference beam 200 is inputted to the telecentric optical system composed of the lenses 21 and 22, to irradiate the mask 116 therewith. However, since the angle fine adjustment mirror 20 and the mask 116 are in the imaging relationship, the angle of the reference beam 200 contracted by and outgoing from the mask 116 is similarly varied due to the angle variation of the angle fine adjustment mirror 20, and the reference beam 200 is incident on the telecentric optical system composed of the lenses 17 and 18. Since the mask 116 and the diffraction grating 111 are in the imaging relationship, the reference beam 200 is incident on the diffraction grating 111 at an angle according to the angle variation of the beam outgoing from the mask 116, to be changed. This ensures that the angle of incidence of the reference beam 200 on the hologram recording material can be finely varied by finely regulating the angle fine adjustment mirror 20.

According to this embodiment, the following merit can be obtained. In the case of using the diffraction grating 121 for stepwise deflection shown in FIGS. 12A and 12B, if the optimum angle of incidence of the reference beam 200 on the hologram recording material is deviated due to positional deviations of optical component parts or shrinkage of the hologram recording material arising from a temperature variation or the like, the reproduced image would be darker. However, an angle correction can be achieved by finely adjusting the angle of incidence of the reference beam 200 on the hologram recording material by the angle fine adjustment mirror 20, whereby images with good quality can always be reproduced.

Example 7

Figure 18A:
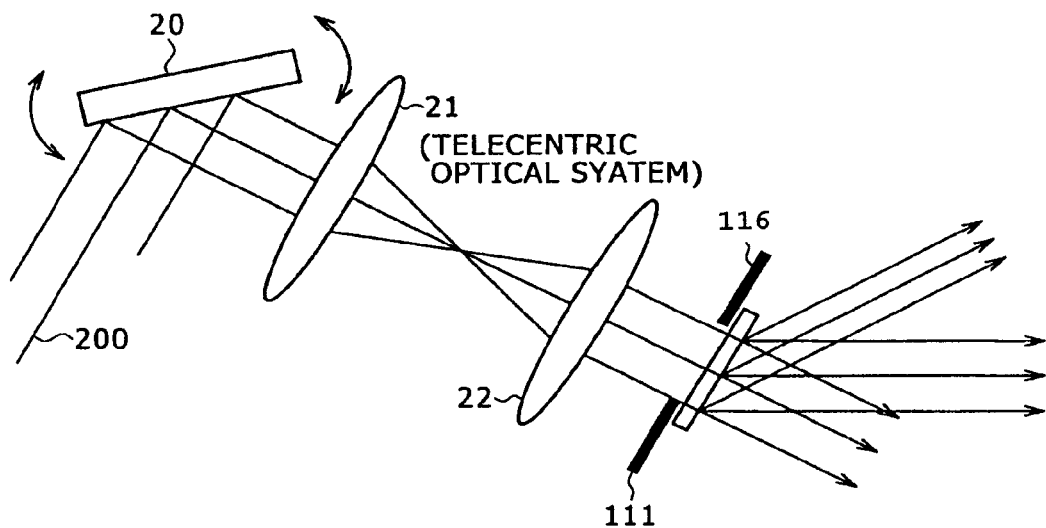
FIGS. 18A and 18B are diagrams showing another example of the reference beam optical system according to the sixth embodiment shown in FIG. 17.
Figure 18B:
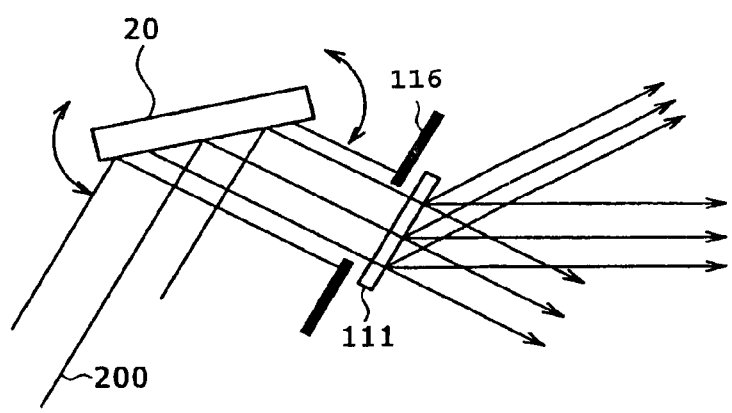

FIGS. 18A and 18B are block diagrams showing the configuration of a reference beam optical system of a hologram recording apparatus according to a seventh embodiment of the present invention. FIG. 18A shows a configuration obtained by eliminating the telecentric optical system composed of the lenses 17 and 18 from the configuration shown in FIG. 16, and disposing a mask 116 close to the diffraction grating 111. FIG. 18B shows a configuration obtained by removing the telecentric optical system composed of the lenses 21 and 22 from the configuration of FIG. 18A. Such a simplification of configuration promises a reduction in the number of optical component parts and reductions in size and weight of a pick-up, but has the problem that the optical axis is deviated from the center when the angle fine adjustment mirror 20 is rotated. However, if the regulation angle of the angle fine adjustment mirror 20 is little, even a simpler configuration as shown in FIG. 18B can provide a performance and effects applicable to practical use.

Figure 19:
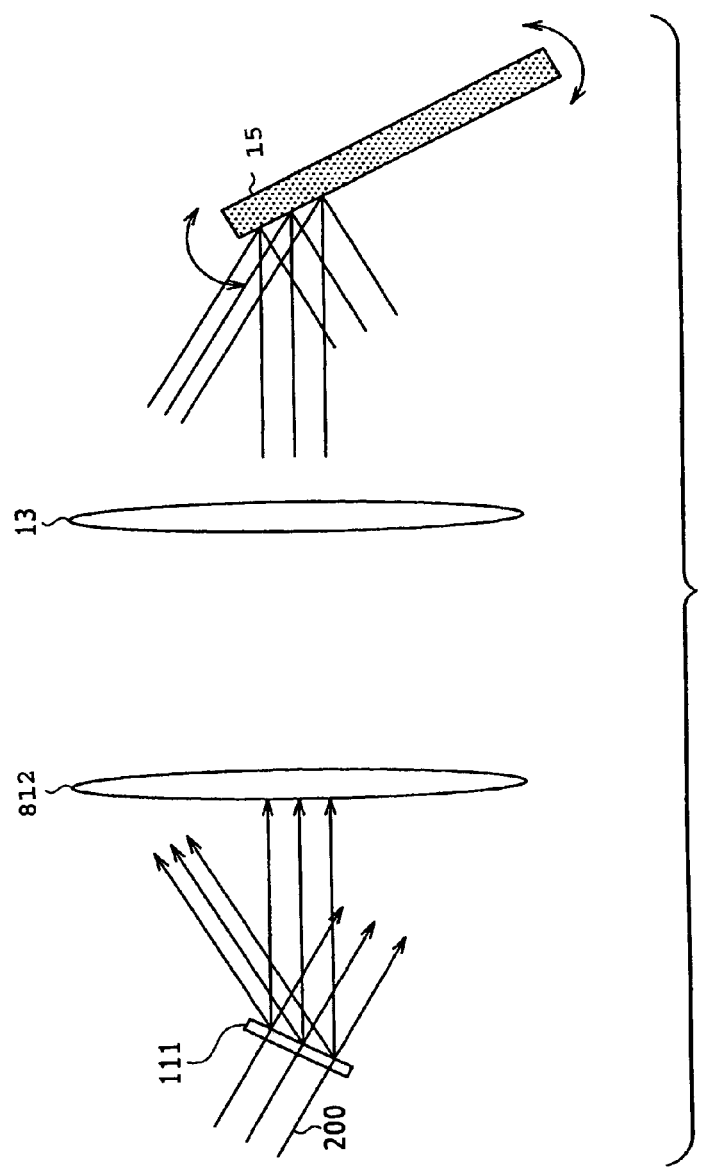
FIG. 19 is a diagram showing a further example of the reference beam optical system according to the sixth embodiment shown in FIG. 17.
Figure 20:
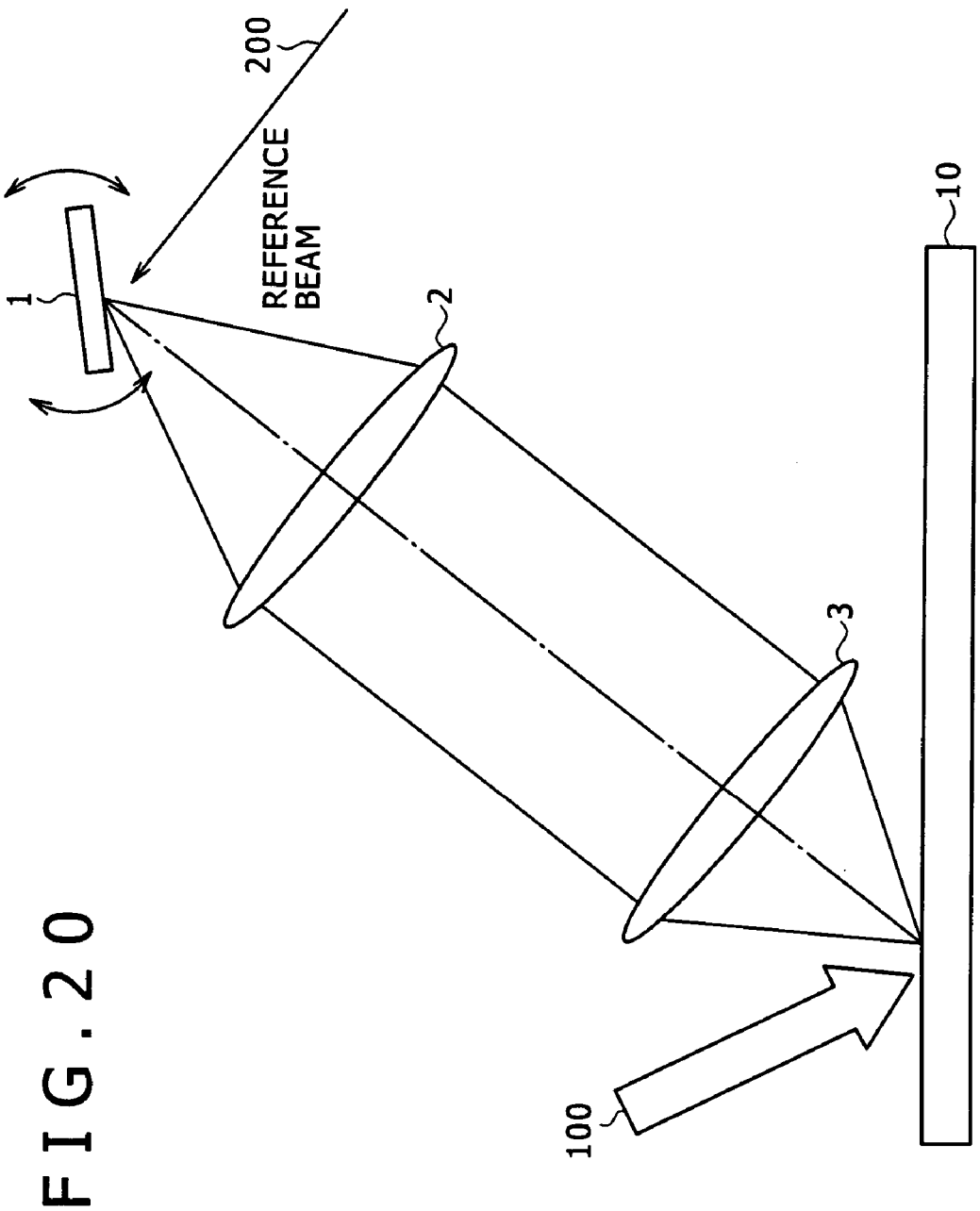
FIG. 20 is a diagram showing the related-art configuration of a reference beam optical system for recording holograms on a hologram recording material by the angle multiple system.
Figure 21:
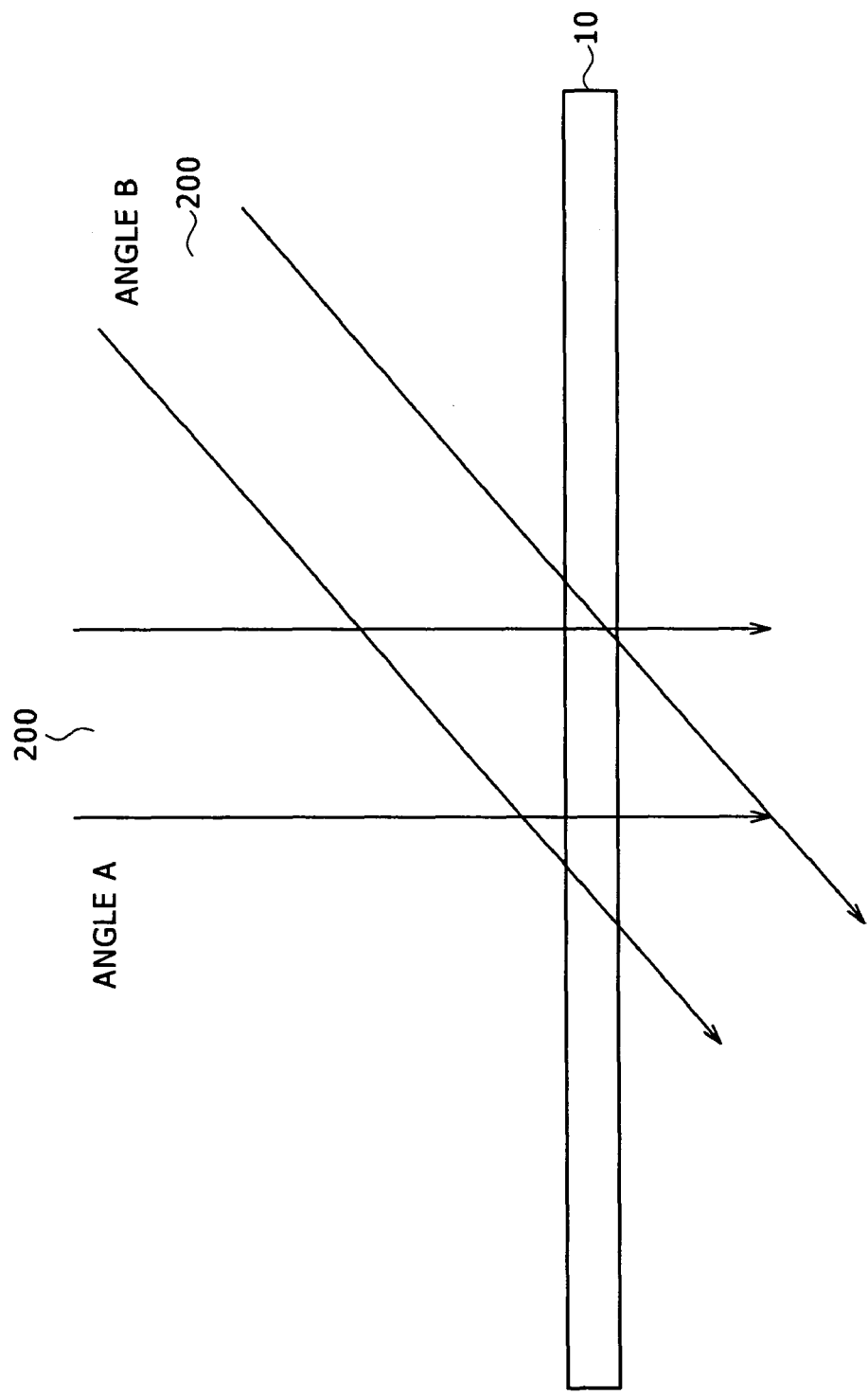
FIG. 21 is a diagram illustrating the variation in the area of irradiation of the hologram recording material with the reference beam according to the variation in the incidence angle of the reference beam shown in FIG. 20.
Figure 22A:
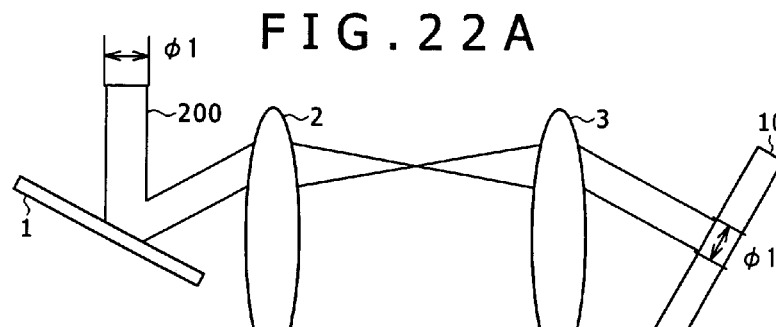
FIGS. 22A, 22B and 22C are diagrams showing the manner in which the irradiation area is varied in relation to a variation in the incidence angle of the reference beam shown in FIG. 21.
Figure 22B:
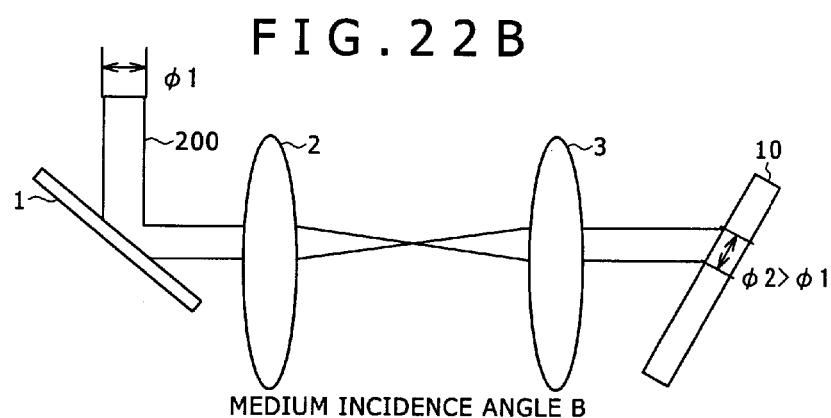
Figure 22C:
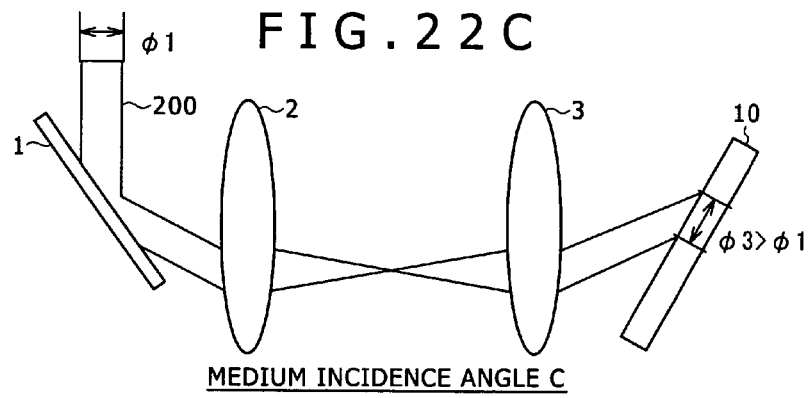

Incidentally, while the optimum image reproduction has been realized by fine adjustment of the angle of incidence of the reference beam 200 on the hologram recording material in this embodiment, the same effect can be obtained also by finely adjusting the incidence angle of the reference beam 200 in a relative manner through finely regulating the layout angle of the hologram recording material 15 as shown in FIG. 19.

Incidentally, the present invention is not limited to the above-described embodiments, and can be carried out in other various forms in regard of specific configuration, function, action and effect, within such ranges as not to depart from the gist of the invention. For example, while the diffracting optical device has been used as the hologram scanner in the above embodiments, an acousto-optical device may be used to produce the same effect.

What is claimed is:

1. A hologram recording apparatus for recording, on a hologram recording medium by an angle multiplex system, an interference fringe generated by interference between a signal beam and a reference beam varied in an angle of incidence with respect to a normal to the surface of said hologram recording medium, on said hologram recording medium, comprising:
    an irradiation range fixing section configured to regulate a beam diameter of the reference beam based on the angle of incidence of the reference beam with respect to the normal to the surface of said hologram recording medium, such that changes in a range of irradiation of said hologram recording medium with said reference beam as the angle of incidence of the reference beam with respect to the normal to the surface of said hologram recording medium is varied are offset, and the range of irradiation of said hologram recording medium with said reference beam is maintained substantially constant, the irradiation range fixing section being configured to change a ratio between a length of a major axis of the reference beam and a length of a minor axis of the reference beam to regulate the beam diameter, wherein the irradiation range fixing section is configured to maintain the length of the minor axis of the reference beam at a fixed length.

2. The hologram recording apparatus as set forth in claim 1, wherein said irradiation range fixing section is a beam diameter regulating section configured to regulate the beam diameter of said reference beam, and said beam diameter regulating section being provided in a reference beam optical system.

3. The hologram recording apparatus as set forth in claim 2, wherein said beam diameter regulating section is configured to regulate said beam diameter of said reference beam; and an angle deflecting device configured to vary said incidence angle of said reference beam.

4. The hologram recording apparatus as set forth in claim 3, wherein said beam diameter regulating section is a slit, said angle deflecting device is a scan mirror, and said beam diameter regulating section is configured to vary the angle of arrangement of said slit in accordance with the angle variation of said scan mirror.

5. The hologram recording apparatus as set forth in claim 1, wherein said irradiation range fixing section comprises a slit which is fixedly disposed, and a lens group of a telecentric imaging optical system for irradiating said slit with said reference beam.

6. The hologram recording apparatus as set forth in claim 5, wherein the positional relationship between said hologram recording medium and said slit is so set that said hologram recording medium and said slit satisfy the Shcheimpflug rule, by said lens group of said telecentric imaging optical system for irradiating said hologram recording medium, disposed to be inclined against an optical axis, with said interference having passed through said slit.

7. The hologram recording apparatus as set forth in claim 1, further comprising:
    an intensity regulating section for making always substantially constant the intensity of said reference beam in said irradiation range on said hologram recording medium.

8. The hologram recording apparatus as set forth in claim 1, wherein
    said hologram recording medium and a diffracting optical device, including a diffracting optical grating, are disposed in an imaging relationship to constitute a telecentric optical system, and
    said irradiation range fixing section is the diffracting optical grating which has a varying diffraction grating gap.

9. The hologram recording apparatus as set forth in claim 8, wherein said diffraction grating gap has a diffraction grating gap which varies continuously in relation to the deflection angle.

10. The hologram recording apparatus as set forth in claim 8, wherein said diffraction grating gap has a diffraction grating gap which varies discretely in relation to the deflection angle.

11. The hologram recording apparatus as set forth in claim 10, wherein a scan mirror is disposed in front of said diffracting optical device, with a second telecentric optical system therebetween.

12. The hologram recording apparatus as set forth in claim 8,
    wherein the diffraction grating gap thereof has a diffraction grating gap varying discretely in relation to a split angle obtained by splitting the deflection angle, and a diffraction grating gap in the same split angle varies a little.

13. The hologram recording apparatus as set forth in claim 8, wherein said diffracting optical device varies in diffraction efficiency on the basis of each deflection angle.

14. The hologram recording apparatus as set forth in claim 8, wherein a reference beam optical system in which said reference beam proceeds comprises an optical system for limiting the beam diameter of said reference beam.

15. The hologram recording apparatus as set forth in claim 14, wherein said optical system for limiting the beam diameter of said reference beam has a mask for contracting said reference beam.

16. The hologram recording apparatus as set forth in claim 15, wherein said mask disposed close to said diffracting optical device, with a second telecentric optical system therebetween.

17. The hologram recording apparatus as set forth in claim 15, wherein said mask is disposed close to said diffracting optical device.

18. The hologram recording apparatus as set forth in claim 8, wherein said reference beam optical system comprises an optical part for fine adjustment of the angle of said reference beam.

19. The hologram recording apparatus as set forth in claim 18, wherein said optical part for fine adjustment of the angle of said reference beam is a scan mirror for changing the path of said reference beam, and said scan mirror is disposed in said reference beam optical system on the light source side of said diffracting optical device.

20. The hologram recording apparatus as set forth in claim 19, wherein a mask is disposed close to said diffracting optical device.

21. The hologram recording apparatus as set forth in claim 19, wherein a mask is disposed close to said diffracting optical device, with a second telecentric optical system therebetween.

22. The hologram recording apparatus as set forth in claim 1, wherein the irradiation range fixing section is configured to regulate the beam diameter of the reference beam in accordance with the following relationship $$\Phi' = \Phi \cos \theta,$$

$\Phi'$ representing the regulated beam diameter of the reference beam, $\Phi$ representing a diameter of the range of irradiation of said hologram recording medium with said reference beam, and $\theta$ representing the angle of incidence of the reference beam.

23. A hologram recording method of recording, on a hologram recording medium by an angle multiplex system, an interference fringe generated by interference between a signal beam and a reference beam varied in an angle of incidence with respect to a normal to the surface of said hologram recording medium, on said hologram recording medium, said method comprising:

regulating a beam diameter of said reference beam based on the angle of incidence of the reference beam with respect to the normal to the surface of said hologram recording medium, such that changes in a range of irradiation of said hologram recording medium with said reference beam as the angle of incidence of the reference beam with respect to the normal to the surface of said hologram recording medium is varied are offset, and the range of irradiation of said hologram recording medium with said reference beam is maintained substantially constant, wherein the regulating the beam diameter based on the angle of incidence includes changing a ratio between a length of a major axis of the reference beam and a length of a minor axis of the reference beam, the length of the minor axis of the reference beam being maintained at a fixed length.

24. The hologram recording method as set forth in claim 23, wherein the step of regulating comprises regulating the beam diameter of the reference beam in accordance with the following relationship $$\Phi' = \Phi \cos \theta,$$

$\Phi'$ representing the regulated beam diameter of the reference beam, b representing a diameter of the range of irradiation of said hologram recording medium with said reference beam, and $\theta$ representing the angle of incidence of the reference beam.

* * * * *